US009627907B2

(12) United States Patent
Ohashi et al.

(10) Patent No.: US 9,627,907 B2
(45) Date of Patent: Apr. 18, 2017

(54) STORAGE BATTERY CONTROL DEVICE, STORAGE BATTERY CONTROL METHOD, PROGRAM, ELECTRICITY STORAGE SYSTEM, AND POWER SUPPLY SYSTEM

(71) Applicant: OMRON CORPORATION, Kyoto (JP)

(72) Inventors: Makoto Ohashi, Kyoto (JP); Takeo Nishikawa, Kyoto (JP); Yoshinori Sunahata, Shiga (JP); Junichiro Yamada, Kyoto (JP); Wataru Okada, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 261 days.

(21) Appl. No.: 14/378,107

(22) PCT Filed: Jan. 24, 2013

(86) PCT No.: PCT/JP2013/051379

§ 371 (c)(1),
(2) Date: Aug. 12, 2014

(87) PCT Pub. No.: WO2013/136851

PCT Pub. Date: Sep. 19, 2013

(65) Prior Publication Data

US 2015/0002102 A1 Jan. 1, 2015

(30) Foreign Application Priority Data

Mar. 13, 2012 (JP) ................................ 2012-055753

(51) Int. Cl.

| | |
|---|---|
| ***H02J 7/00*** | (2006.01) |
| ***H01M 10/44*** | (2006.01) |
| ***H01M 10/48*** | (2006.01) |

(52) U.S. Cl.

CPC ......... *H02J 7/0063* (2013.01); *H01M 10/441* (2013.01); *H01M 10/482* (2013.01);

(Continued)

(58) Field of Classification Search

USPC ................................................ 320/135, 136

See application file for complete search history.

(56) References Cited

U.S. PATENT DOCUMENTS

| | | | | |
|---|---|---|---|---|
| 6,285,572 | B1 | 9/2001 | Onizuka et al. | |
| 6,741,065 | B1 * | 5/2004 | Ishii .................... | B60L 11/1816 320/122 |
| 2004/0222768 | A1 * | 11/2004 | Moore .................. | H02J 7/0075 320/128 |

FOREIGN PATENT DOCUMENTS

| | | |
|---|---|---|
| JP | 2000-278872 | 10/2000 |
| JP | 2000-305633 | 11/2000 |
| JP | 2011-223651 | 11/2011 |

OTHER PUBLICATIONS

U.S. Appl. No. 14/373,440 to Takeo Nishikawa et al., filed Jul. 21, 2014.

(Continued)

*Primary Examiner* — Brian Ngo

(74) *Attorney, Agent, or Firm* — Greenblum & Bernstein, P.L.C.

(57) ABSTRACT

The present disclosure relates to a storage battery control device that can exert better performance in a configuration in which a plurality of storage batteries are connected, a storage battery control method, a program, an electricity storage system, and a power supply system. A charge order table previously set according to a state of charge and a charge/discharge frequency of a storage battery that stores power is referred to, and based on the states of charge and the charge/discharge frequencies acquired from the storage battery provided in plural, a discharge order based on which (Continued)

discharge is preferentially performed with respect to the plurality of storage batteries is decided. In order to supply necessary power necessary to be output upon a request from a load, discharge power output from each of the plurality of storage batteries is set based on the decided discharge order.

10 Claims, 13 Drawing Sheets

(52) U.S. Cl.
CPC .......... *H02J 7/0013* (2013.01); *H02J 7/0022* (2013.01); *H02J 2007/0067* (2013.01)

(56) References Cited

OTHER PUBLICATIONS

International Search Report from PCT/JP2013/051379, mail date is Mar. 19, 2013.

* cited by examiner

15
Power supply
14
Charge unit
Discharge unit
Storage battery
B M S
22-1
23-1
21-1
24-1
12-1
22-2
23-2
21-2
24-2
12-2
22-3
23-3
21-3
24-3
12-3
Load
16-1
Load
16-2
13
Input/output unit
31
Memory
32
CPU
33
11

Fig. 2

Discharge order table

| Charge/discharge frequency | SOC0–SOC1 | SOC1–SOC2 | SOC2–SOC3 | SOC3–SOC4 | SOC4–SOC5 | SOC5–SOC6 |
|---|---|---|---|---|---|---|
| CNT5–CNT6 | 36 | 35 | 34 | 27 | 26 | 25 |
| CNT4–CNT5 | 33 | 32 | 31 | 24 | 23 | 22 |
| CNT3–CNT4 | 30 | 29 | 28 | 21 | 20 | 19 |
| CNT2–CNT3 | 18 | 17 | 16 | 9 | 8 | 7 |
| CNT1–CNT2 | 15 | 14 | 13 | 6 | 5 | 4 |
| CNT0–CNT1 | 12 | 11 | 10 | 3 | 2 | 1 |

State of charge [%]

Power supply
15
14
51-1
51-2
51-3
Controller
52-1
Controller
52-2
Controller
52-3
Storage battery
22-1
Storage battery
21-2
Storage battery
21-3
BMS
24-1
BMS
24-2
BMS
24-3
Load
16-1
Load
16-2
11'

STORAGE BATTERY CONTROL DEVICE, STORAGE BATTERY CONTROL METHOD, PROGRAM, ELECTRICITY STORAGE SYSTEM, AND POWER SUPPLY SYSTEM

TECHNICAL FIELD

The present disclosure relates to a storage battery control device, a storage battery control method, a program, an electricity storage system, and a power supply system, particularly to a storage battery control device that can exert better performance in a configuration in which a plurality of storage batteries are connected, a storage battery control method, a program, an electricity storage system, and a power supply system.

BACKGROUND ART

Conventionally, an electricity storage system to which a plurality of storage batteries are connected is used to obtain a prescribed capacity that cannot be obtained by one storage battery. Performance of the electricity storage system depends on a method for controlling a charge or a discharge of each storage battery.

For example, Patent Document 1 discloses a technology in which, in a power supply system including a solar cell and a plurality of inverters, an inverter acting as a master unit controls operation and stopping of the remaining inverters based on a change in a power generation amount of the solar cell or a change in an AC output amount from the inverters.

However, although the power supply system disclosed in Patent Document 1 can perform the operation without depending on a specific inverter, there is a risk that power cannot efficiently be output because conversion efficiency of the inverter is not considered.

PRIOR ART DOCUMENT

Patent Document

Patent Document 1: Japanese Unexamined Patent Publication No. 2000-305633

SUMMARY OF THE INVENTION

Problem to be Solved by the Invention

In the conventional electricity storage system, the discharge is performed based on one of a control method in which the plurality of storage batteries are safely discharged while states of charge of the storage batteries are equalized and a control method in which the discharge is performed such that the conversion efficiency becomes the maximum. Accordingly, in the conventional electricity storage system, there is performed one of the control based on a discharge current, the temperature of the storage battery in discharge, and a discharge voltage and the wide-range, high-efficiency control based on a combination of storage batteries that vary in efficiency according to the output, but the control is not performed in consideration of a balance among a life and the state of charge of the storage battery and the conversion efficiency.

There is a demand to be able to exert good performance as the whole system in consideration of a balance among the life and the state of charge of the storage battery and the conversion efficiency.

In view of the above, an object of the disclosure is to be able to exert the better performance in the configuration in which the storage batteries are connected.

Means for Solving the Problem

In accordance with one aspect of the disclosure, a storage battery control device includes: a decision unit configured to refer to an order previously set according to at least two parameters defining a life and output of a storage battery that stores power, and to decide, based on the parameters acquired from the storage battery provided in plural, a discharge order based on which discharge is preferentially performed with respect to the plurality of storage batteries; and a discharge power setting unit configured to set discharge power output from each of the plural storage batteries based on the discharge order in order to supply necessary power necessary to be output upon a request from an outside.

In accordance with another aspect of the disclosure, a storage battery control method or a program includes the steps of: referring to an order previously set according to at least two parameters defining a life and output of a storage battery that stores power, and deciding, based on the parameters acquired from the storage battery provided in plural, a discharge order based on which discharge is preferentially performed with respect to the plurality of storage batteries; and setting discharge power output from each of the plurality of storage batteries based on the discharge order in order to supply necessary power necessary to be output upon a request from an outside.

In accordance with still another aspect of the disclosure, an electricity storage system includes: a plurality of storage batteries that store power; a decision unit configured to refer to an order previously set according to at least two parameters defining a life and output of the storage batteries, and to decide, based on the parameters acquired from the plurality of storage batteries, a discharge order based on which discharge is preferentially performed with respect to the plural storage batteries; and a discharge power setting unit configured to set discharge power output from each of the plural storage batteries based on the discharge order in order to supply necessary power necessary to be output upon a request from an outside.

In accordance with yet another aspect of the disclosure, an electricity storage system includes: a power supply including one of a DC power supply in which at least natural energy is used and an AC power supply configured to supply power via a power system; a load connected to the power supply via a power wiring to consume the power; a plurality of storage batteries connected in parallel to the power supply via the power wiring to store the power; a decision unit configured to refer to an order previously set according to at least two parameters defining a life and output of the storage batteries, and to decide, based on the parameters acquired from the plurality of storage batteries, a discharge order based on which discharge is preferentially performed with respect to the plural storage batteries; and a discharge power setting unit configured to set discharge power output from each of the plural storage batteries based on the discharge order in order to supply necessary power necessary to be output upon a request from the load.

In the aspects of the disclosure, the order previously set according to at least the two parameters defining the life and the output of the storage battery that stores the power is referred to, the discharge order based on which the discharge is preferentially performed with respect to the plurality of storage batteries is decided based on the parameters acquired from the plurality of storage batteries, and the discharge power output from each of the plurality of storage batteries is set based on the discharge order in order to supply the necessary power necessary to be output upon the request from the outside.

Effect of the Invention

According to one aspect of the disclosure, the better performance can be exerted in the configuration in which the storage batteries are connected.

BRIEF DESCRIPTION OF THE DRAWINGS

FIG. 2 is a diagram illustrating a discharge order table.

FIG. 4 is a diagram illustrating order based on which a storage battery is discharged while the discharge order table is referred to.

MODE FOR CARRYING OUT THE INVENTION

Specific embodiments to which the technology of the disclosure is applied will be described below with reference to the drawings.

Figure 1:
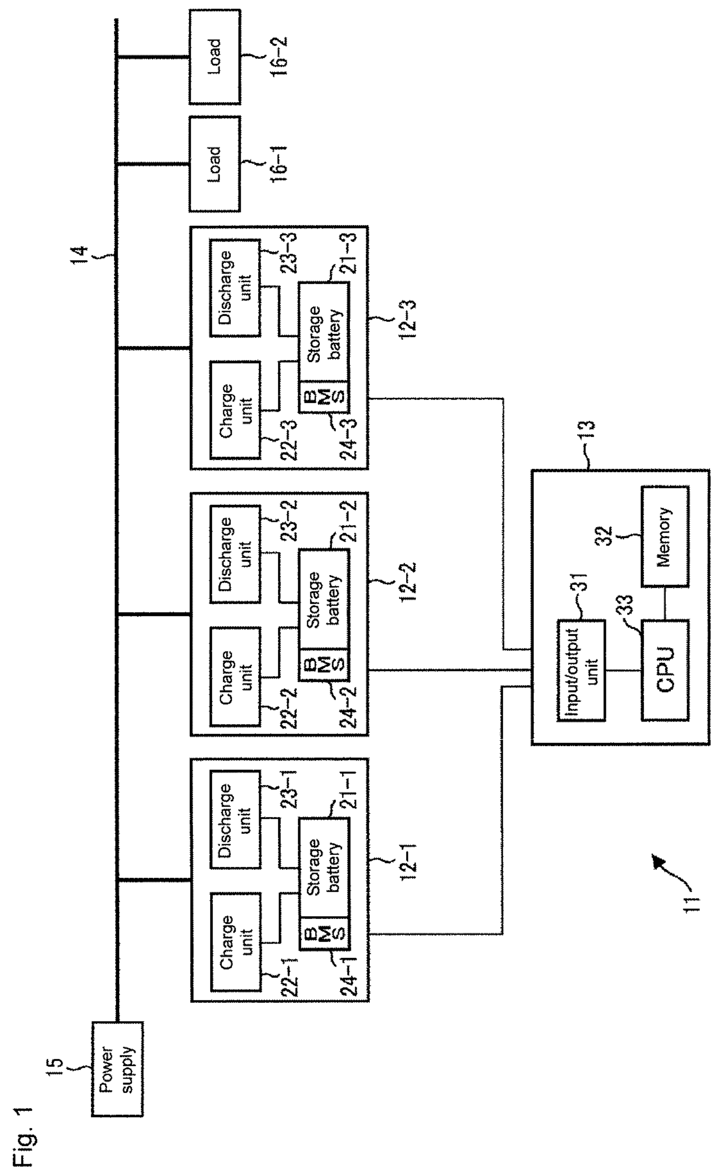
FIG. 1 is a block diagram illustrating a configuration example of an electricity storage system according to a first embodiment to which the technology of the disclosure is applied.

FIG. 1 is a block diagram illustrating a configuration example of an electricity storage system according to a first embodiment to which the technology of the disclosure is applied.

Referring to FIG. 1, electricity storage system 11 includes three electricity storage devices 12-1 to 12-3 and control device 13. In the configuration of the power supply system including electricity storage system 11, power supply 15 that supplies power through a power system and loads 16-1 and 16-2 that consume the power are connected to each other via power wiring 14 through which the power is transmitted to electricity storage system 11. Power supply 15 includes a DC power supply in which such natural energy as sunlight and wind power is used and an AC power supply, such as a commercial power supply, which supplies the power via the power system.

Electricity storage devices 12-1 to 12-3 are connected to loads 16-1 and 16-2 via power wiring 14 while connected to power supply 15 in parallel via power wiring 14. Electricity storage devices 12-1 to 12-3 store the power supplied from power supply 15 via power wiring 14, and supply the stored power to loads 16-1 and 16-2 via power wiring 14.

Electricity storage devices 12-1 to 12-3 include storage batteries 21-1 to 21-3, charge units 22-1 to 22-3, discharge units 23-1 to 23-3, and battery management systems (BMS) 24-1 to 24-3, respectively. Electricity storage devices 12-1 to 12-3 have the similar configuration. Hereinafter, electricity storage devices 12-1 to 12-3 are referred to as electricity storage device 12 unless necessary to distinguish them from each other. The same holds true for storage batteries 21-1 to 21-3, charge units 22-1 to 22-3, discharge units 23-1 to 23-3, and battery management systems 24-1 to 24-3.

Storage battery 21 can store a prescribed capacity of power, and maintain prescribed charge performance until storage battery 21 reaches a prescribed number of charge/discharge operations. A ratio of a remaining quantity of the power stored in storage battery 21 to a rated capacity of the power that can be stored in storage battery 21 is referred to as a state of charge of storage battery 21, and the number of charge/discharge operations of storage battery 21 is referred to as a charge/discharge frequency. The state of charge defines output of storage battery 21, and the charge/discharge frequency defines a life of storage battery 21.

Under the control of control device 13, charge unit 22 performs AC/DC (Alternating Current/Direct Current) conversion of the power supplied via power wiring 14 according to voltage of storage battery 21, and charges storage battery 21.

Under the control of control device 13, discharge unit 23 performs DC/AC (Direct Current/Alternating Current) of the power stored in storage battery 21, outputs the AC power to power wiring 14 according to, for example, the phase of the power transmitted via power wiring 14, and supplies the AC power to loads 16-1 and 16-2.

Battery management system 24 conducts communication with control device 13 to manage storage battery 21. For example, battery management system 24 measures the state of charge of storage battery 21, counts the charge/discharge frequency of storage battery 21, and sends pieces of data indicating the state of charge and the charge/discharge frequency of storage battery 21 to control device 13.

Control device 13 includes input/output unit 31, memory 32, and CPU (Central Processing Unit) 33.

Input/output unit 31 is an interface that conducts communication with electricity storage device 12. Input/output unit 31 acquires data sent from battery management system 24, sends a control signal issuing a charge instruction to charge unit 22, and sends a control signal issuing a discharge instruction to discharge unit 23.

A program executed by CPU 33 and various pieces of data necessary for CPU33 to execute the program are stored in memory 32. For example, a discharge order table (see FIG. 2), which is referred to by CPU 33 to decide discharge orders of electricity storage devices 12-1 to 12-3 when CPU 33 executes the program controlling the discharges of electricity storage devices 12-1 to 12-3, is stored in memory 32.

CPU 33 reads and executes the program stored in memory 32, controls the whole of electricity storage system 11, and controls the discharges of, for example, electricity storage devices 12-1 to 12-3.

The discharge order table stored in memory 32 will be described below with reference to FIG. 2.

As illustrated in FIG. 2, the discharge order table is set based on the state of charge and the charge/discharge frequency of storage battery 21. In the example of FIG. 2, the discharge order table is constructed with a 6-by 6 cells, and the discharge order "1" having the highest priority to the discharge order "36" having the lowest priority are set in cells of the discharge order table.

A column direction of the discharge order table is segmented by charge/discharge frequencies CNT0 to CNT6, charge/discharge frequency CNT0 is set to 0 times, and charge/discharge frequency CNT6 is set to a frequency (for example, 3000 to 4000) corresponding to, for example, a charge ability of storage battery 21. For example, charge/discharge frequency CNT3 is set to a frequency obtained such that a prescribed margin coefficient is added to a frequency, obtained by multiplying an average charge/discharge frequency per day by days to the next exchange of storage battery 21, as a first threshold that serves as a criterion encouraging a user to exchange storage battery 21. Charge/discharge frequencies CNT1 and CNT2 are set so as to equally segment charge/discharge frequency CNT0 to charge/discharge frequency CNT3, and charge/discharge frequencies CNT4 and CNT5 are set so as to equally segment charge/discharge frequency CNT3 to charge/discharge frequency CNT6. Charge/discharge frequencies CNT1 and CNT2 and charge/discharge frequencies CNT4 and CNT5 may be set not equally but in any ratio.

A row direction of discharge order table is segmented by states of charge SOC0 to SOC6. For example, state of charge SOC0 is set to 0% and state of charge SOC6 is set to 100%. For example, state of charge SOC3 is set to a numerical value in which a prescribed margin coefficient is added to a numerical value obtained by dividing a product of necessary time and necessary power by a rated capacity of storage battery 21, as a second threshold that serves as a criterion in determining whether discharge order decision processing is performed. States of charge SOC1 and SOC2 are set so as to equally segment state of charge SOC0 to state of charge SOC3, and states of charge SOC4 and SOC5 are set so as to equally segment state of charge SOC3 to state of charge SOC6. States of charge SOC1 and SOC2 and states of charge SOC4 and SOC5 may be set not equally but in any ratio.

Therefore, the discharge order table is classified into first to fourth groups by charge/discharge frequency CNT3 that is of the first threshold and state of charge SOC3 that is of the second threshold. The first group includes nine cells in which the charge/discharge frequency is less than or equal to charge/discharge frequency CNT3 while the state of charge is greater than state of charge SOC3. The second group includes nine cells in which the charge/discharge frequency is less than or equal to charge/discharge frequency CNT3 while the state of charge is less than or equal to state of charge SOC3. The third group includes nine cells in which the charge/discharge frequency is greater than charge/discharge frequency CNT3 while the state of charge is greater than the state of charge SOC3. The fourth group includes nine cells in which the charge/discharge frequency is greater than charge/discharge frequency CNT3 while the state of charge is less than or equal to state of charge SOC3.

The discharge order "1" having the highest priority to the discharge order "9" are set to the nine cells of the first group, and the discharge order "10" having the priority next to the first group to the discharge order "18" are set to the nine cells of the second group. The discharge order "19" having the priority next to the second group to the discharge order "27" are set to the nine cells of the third group, and the discharge order "28" having the priority next to the third group to the discharge order "36" are set to the nine cells of the fourth group.

In each group, the discharge order having the higher priority is preferentially set from the row of the cells having the lower charge/discharge frequency and from the cell having the higher state of charge in each row.

That is, in the first group, in the row of the cells segmented by charge/discharge frequencies CNT0 and CNT1 having the lowest charge/discharge frequency, the discharge order "1" is set to the cell segmented by states of charge SOC5 and SOC6 having the highest state of charge, the discharge order "2" is set to the cell segmented by states of charge SOC4 and SOC5 having the second highest state of charge, and the discharge order "3" is set to the cell segmented by states of charge SOC3 and SOC4 having the third highest state of charge. Then, in the row of the cells segmented by charge/discharge frequencies CNT1 and CNT2 having the second lowest charge/discharge frequency, the discharge order "4" is set to the cell segmented by states of charge SOC5 and SOC6 having the highest state of charge, the discharge order "5" is set to the cell segmented by states of charge SOC4 and SOC5 having the second highest state of charge, and the discharge order "6" is set to the cell segmented by states of charge SOC3 and SOC4 having the third highest state of charge.

In the row of the cells segmented by charge/discharge frequencies CNT2 and CNT3 having the third lowest charge/discharge frequency, the discharge order "7" is set to the cell segmented by states of charge SOC5 and SOC6 having the highest state of charge, the discharge order "8" is set to the cell segmented by states of charge SOC4 and SOC5 having the second highest state of charge, and the discharge order "9" is set to the cell segmented by states of charge SOC3 and SOC4 having the third highest state of charge.

Thus, in the first group, the discharge order "1" to the discharge order "9" are preferentially set from the row of the cells having the lower charge/discharge frequency and from the cell having the higher state of charge in each row.

Similarly, the discharge order "10" to the discharge order "18" are set in the second group, the discharge order "19" to the discharge order "27" are set in the third group, and the discharge order "28" to the discharge order "36" are set in the fourth group.

The discharge order table in which the discharge order is set in the above way is stored in memory 32 of control device 13. In control device 13, CPU 33 refers to the discharge order table to decide the discharge order of electricity storage device 12, and executes the program controlling the discharge of electricity storage device 12 based on the discharge order, thereby implementing a function of the storage battery control device.

Figure 3:
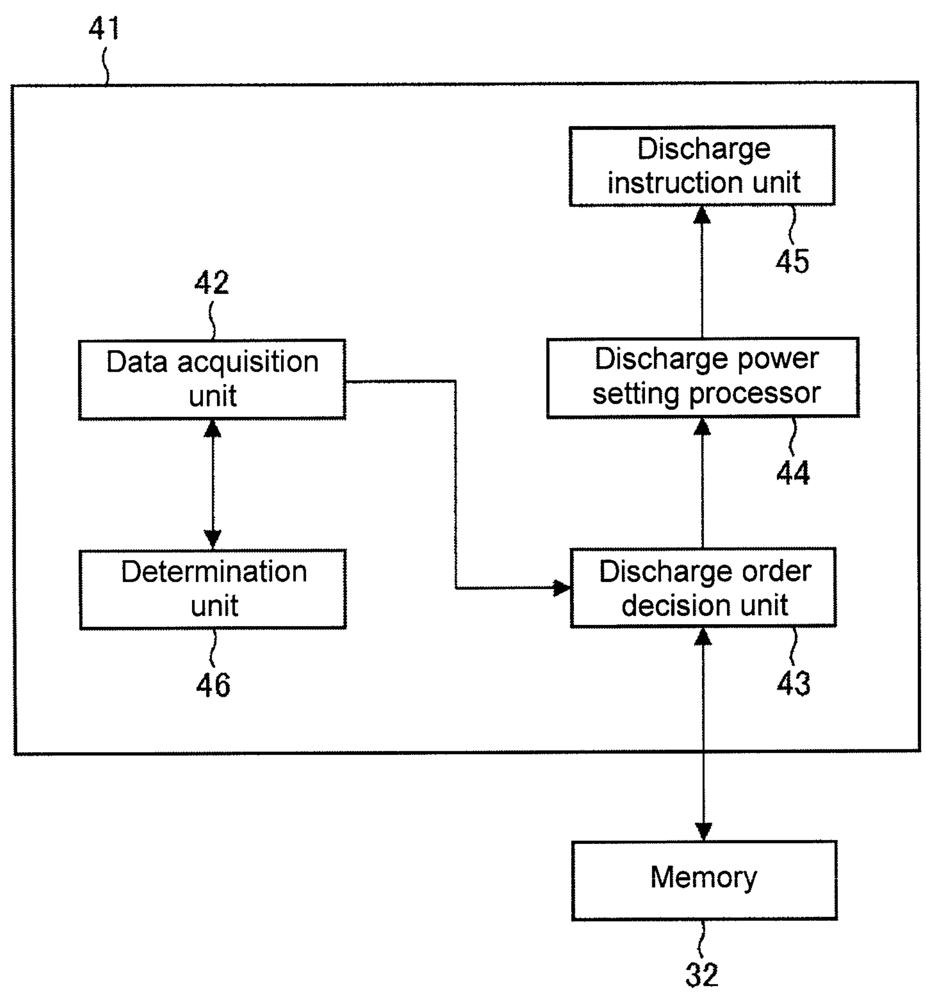
FIG. 3 is a block diagram illustrating a configuration example of a storage battery control device.

FIG. 3 illustrates a functional block, when CPU 33 acts as the storage battery control device that refers to the discharge order table to decide the discharge order of electricity storage device 12 and controls the discharge of electricity storage device 12 based on the discharge order.

As illustrated in FIG. 3, storage battery control device 41 includes data acquisition unit 42, discharge order decision unit 43, discharge power setting processor 44, discharge instruction unit 45, and determination unit 46.

Data acquisition unit 42 periodically conducts communication with each of battery management systems 24-1 to 24-3 of electricity storage devices 12-1 to 12-3 via input/output unit 31 in FIG. 1 to acquire pieces of data indicating the states of charge and the charge/discharge frequencies of storage batteries 21-1 to 21-3. Data acquisition unit 42 supplies the pieces of data indicating the states of charge and the charge/discharge frequencies of storage batteries 21-1 to 21-3 to discharge order decision unit 43 and determination unit 46.

Based on the pieces of data indicating the states of charge and the charge/discharge frequencies of storage batteries 21-1 to 21-3, which are supplied from data acquisition unit 42, discharge order decision unit 43 refers to the discharge order table stored in memory 32, and decides the discharge orders of storage batteries 21-1 to 21-3.

Upon a request from load 16, in order to supply the necessary power necessary to be output from electricity storage system 11, discharge power setting processor 44 performs discharge power setting processing of setting the discharge power output from each of storage batteries 21-1 to 21-3 based on the discharge orders decided by discharge order decision unit 43. The discharge power setting processing performed by discharge power setting processor 44 is described later with reference to FIG. 6.

Discharge instruction unit 45 sends a control signal to discharge units 23-1 to 23-3 via input/output unit 31 such that storage batteries 21-1 to 21-3 output the discharge power set to each of storage batteries 21-1 to 21-3 through the discharge power setting processing performed by discharge power setting processor 44. Therefore, each of storage batteries 21-1 to 21-3 outputs in the set discharge power. For example, in the case that discharge units 23-1 to 23-3 output the discharge power one by one, discharge instruction unit 45 selects storage battery 21 to which the highest priority is decided to be given as the discharge order, from storage batteries 21-1 to 21-3 as storage battery 21 to discharge the power, and sends the control signal issuing the discharge instruction to discharge unit 23 of selected storage battery 21.

Based on the pieces of data indicating the states of charge of storage batteries 21-1 to 21-3, which are periodically acquired by data acquisition unit 42, determination unit 46 determines whether discharge order decision unit 43 performs the discharge order decision processing. For example, in the case that the state of charge of storage battery 21 in discharge becomes less than the second threshold, determination unit 46 determines that discharge order decision unit 43 performs the discharge order decision processing.

Figure 4:
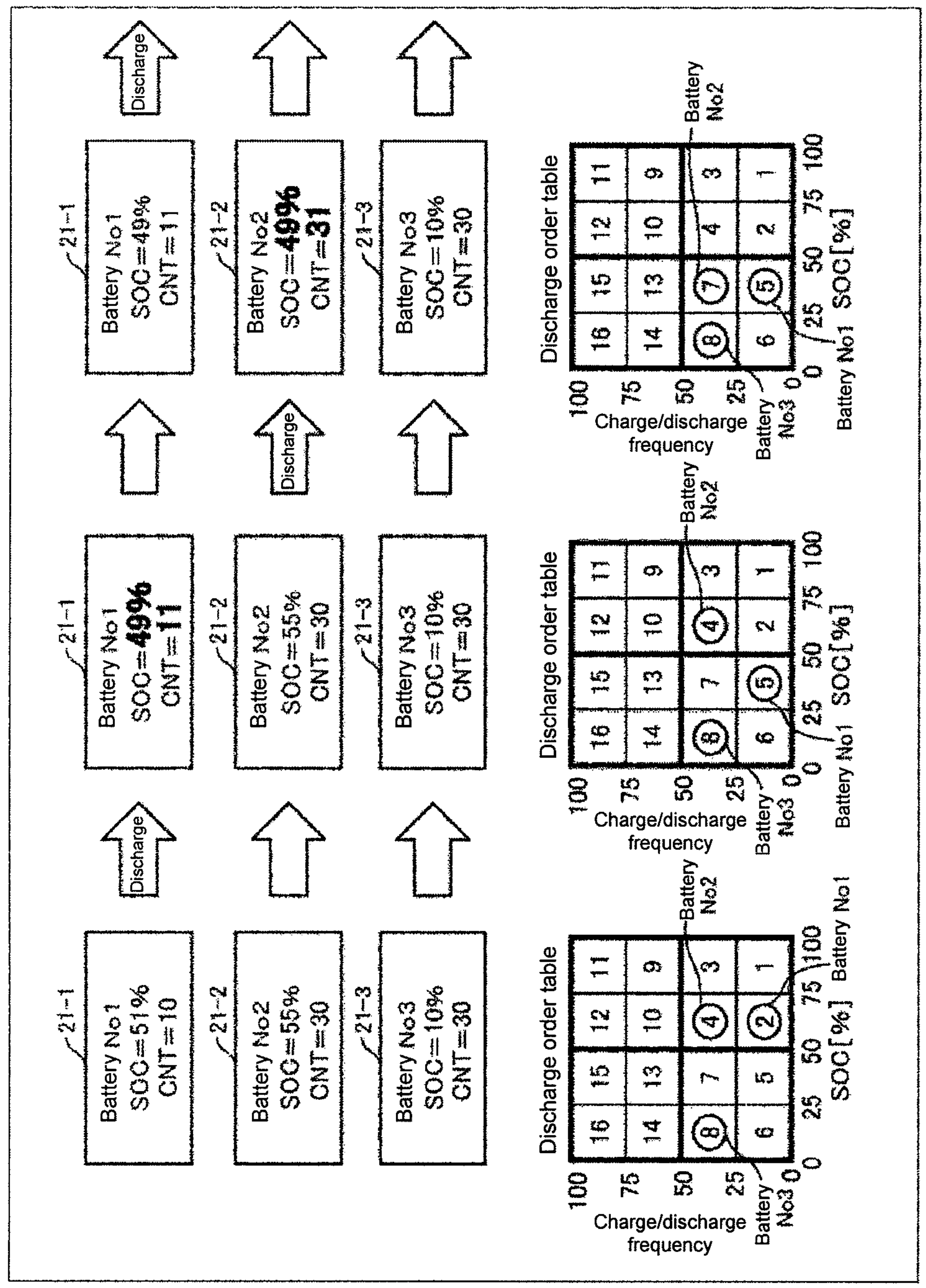

The order based on which storage batteries 21-1 to 21-3 sequentially perform the discharge under the control of storage battery control device 41 will be described below with reference to FIG. 4. In FIG. 4, by way of example, storage batteries 21-1 to 21-3 sequentially perform the discharge.

In FIG. 4, the description is made using the discharge order table in which the column direction is segmented by the charge/discharge frequencies of 0, 25, 50, 75, and 100 while the row direction is segmented by the states of charge of 0%, 25%, 50%, 75%, and 100%. In the discharge order table, the first threshold is set to 50, the second threshold is set to 50%, and the discharge order "1" to the discharge order "16" are set.

For example, as illustrated on the left side in FIG. 4, in the data acquired by data acquisition unit 42, it is assumed that storage battery 21-1 has the state of charge of 51% while having the charge/discharge frequency of 10. Similarly, it is assumed that storage battery 21-2 has the state of charge of 55% while having the charge/discharge frequency of 30, and it is assumed that storage battery 21-3 has the state of charge of 10% while having the charge/discharge frequency of 30.

In this case, the state of charge of storage battery 21-1 is greater than 50% and less than or equal to 75%, and the charge/discharge frequency of storage battery 21-1 is less than or equal to 25. Therefore, discharge order decision unit 43 decides that storage battery 21-1 is set to the discharge order "2". The state of charge of storage battery 21-2 is greater than 50% and less than or equal to 75%, and the charge/discharge frequency of storage battery 21-2 is greater than 25 and less than or equal to 50. Therefore, discharge order decision unit 43 decides that storage battery 21-2 is set to the discharge order "4". Similarly, the state of charge of storage battery 21-3 is less than or equal to 25%, and the charge/discharge frequency of storage battery 21-3 is greater than 25 and less than or equal to 50. Therefore, discharge order decision unit 43 decides that storage battery 21-3 is set to the discharge order "8".

Accordingly, in storage batteries 21-1 to 21-3, discharge instruction unit 45 sends the control signal issuing the discharge instruction to storage battery 21-1 to which the discharge order "2" of the highest priority is set, and discharge unit 23-1 performs the discharge of storage battery 21-1.

Then, as illustrated in the center of FIG. 4, when the state of charge of storage battery 21-1 in discharge becomes 49%, determination unit 46 determines that the discharge order decision processing is performed according to the fact that the state of charge of storage battery 21-1 in discharge becomes less than 50% that is of the second threshold based on the data periodically acquired by data acquisition unit 42.

In response to the determination made by determination unit 46, data acquisition unit 42 acquires the pieces of data indicating the states of charge and the charge/discharge frequencies of storage batteries 21-1 to 21-3, and discharge order decision unit 43 performs the discharge order decision processing based on the pieces of data.

In the example of FIG. 4, according to the change of storage battery 21-1 to the state of charge of 49%, discharge order decision unit 43 refers to the discharge order table to decide that storage battery 21-1 is set to the discharge order "5". Because the state of charge and the charge/discharge frequency of storage battery 21-2 do not change, storage battery 21-2 remains in the discharge order "4", and similarly storage battery 21-3 remains in the discharge order "8".

Accordingly, in storage batteries 21-1 to 21-3, discharge instruction unit 45 sends the control signal issuing the discharge instruction to storage battery 21-2 to which the discharge order "4" having the highest priority is set, and discharge unit 23-2 performs the discharge of storage battery 21-2. At this point, the discharge of storage battery 21-1 is ended, and the charge/discharge frequency of storage battery 21-1 is incremented to 11.

Then, as illustrated on the right side in FIG. 4, when the state of charge of storage battery 21-2 in discharge becomes 49%, determination unit 46 determines that the discharge order decision processing is performed according to the fact that the state of charge of storage battery 21-2 in discharge becomes less than 50% that is of the second threshold based on the data periodically acquired by data acquisition unit 42.

In response to the determination made by determination unit 46, data acquisition unit 42 acquires the pieces of data indicating the states of charge and the charge/discharge frequencies of storage batteries 21-1 to 21-3, and discharge order decision unit 43 performs the discharge order decision processing based on the pieces of data.

In the example of FIG. 4, according to the change of storage battery 21-2 to the state of charge of 49%, discharge order decision unit 43 refers to the discharge order table to decide that storage battery 21-2 is set to the discharge order "7". Because the state of charge and the charge/discharge frequency of storage battery 21-1 do not change, storage battery 21-1 remains in the discharge order "5", and similarly storage battery 21-3 remains in the discharge order "8".

Accordingly, in storage batteries 21-1 to 21-3, discharge instruction unit 45 sends the control signal issuing the discharge instruction to storage battery 21-1 to which the discharge order "5" of the highest priority is set, and discharge unit 23-1 performs the discharge of storage battery 21-1. At this point, the discharge of storage battery 21-2 is ended, and the charge/discharge frequency of storage battery 21-2 is incremented to 31. Then, the similar processing is repeated.

Based on the discharge order decided by discharge order decision unit 43, discharge power setting processor 44 performs the discharge power setting processing of setting the discharge power output from each of storage batteries 21-1 to 21-3. At this point, discharge power setting processor 44 decides the discharge power output from storage battery 21 according to conversion efficiency at which electricity storage device 12 outputs the power, for example, conversion efficiency at which discharge unit 23 performs the DC/AC conversion of the power stored in storage battery 21. Generally the conversion efficiency of electricity storage device 12 is maximized when an output capacity is rated output, and the conversion efficiency decreases as the output capacity decreases from the rated output.

Figure 5:
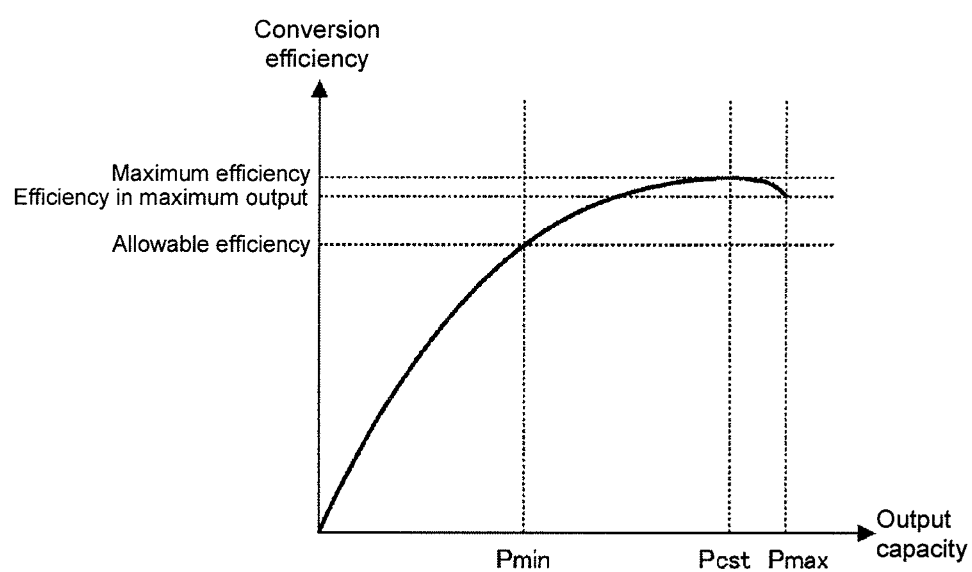
FIG. 5 is a diagram illustrating a relationship between an output capacity and conversion efficiency of an electricity storage device.

A relationship between the output capacity and the conversion efficiency of electricity storage device 12 will be described with reference to FIG. 5. In FIG. 5, a horizontal axis indicates the output capacity of electricity storage device 12, and a vertical axis indicates the conversion efficiency of electricity storage device 12.

As illustrated in FIG. 5, the conversion efficiency of electricity storage device 12 becomes maximum efficiency when the output capacity of electricity storage device 12 is rated output Pcst, and the conversion efficiency of electricity storage device 12 decreases as the output capacity of electricity storage device 12 decreases from rated output Pcst. When the output capacity of electricity storage device 12 is maximum output Pmax that can be output by discharge unit 23, the conversion efficiency of electricity storage device 12 decreases slightly compared with the maximum efficiency.

When the output of the power is restarted after the power output from electricity storage device 12 is tentatively stopped, it is necessary to perform a procedure to match the phase with the AC power transmitted to power wiring 14. Therefore, it is difficult to instantaneously output the required power from electricity storage device 12 in the stopped state. For this reason, the output of electricity storage device 12 is not completely stopped, but allowable efficiency (for example, 80 to 90% of maximum efficiency) that is of the conversion efficiency allowable to some extent is fixed to obtain allowable minimum output Pmin in which the power is output at the allowable efficiency.

Discharge power setting processor 44 sets the output of the whole of electricity storage system 11 such that electricity storage devices 12-1 to 12-3 preferentially output the power at allowable minimum output Pmin or more.

Figure 6:
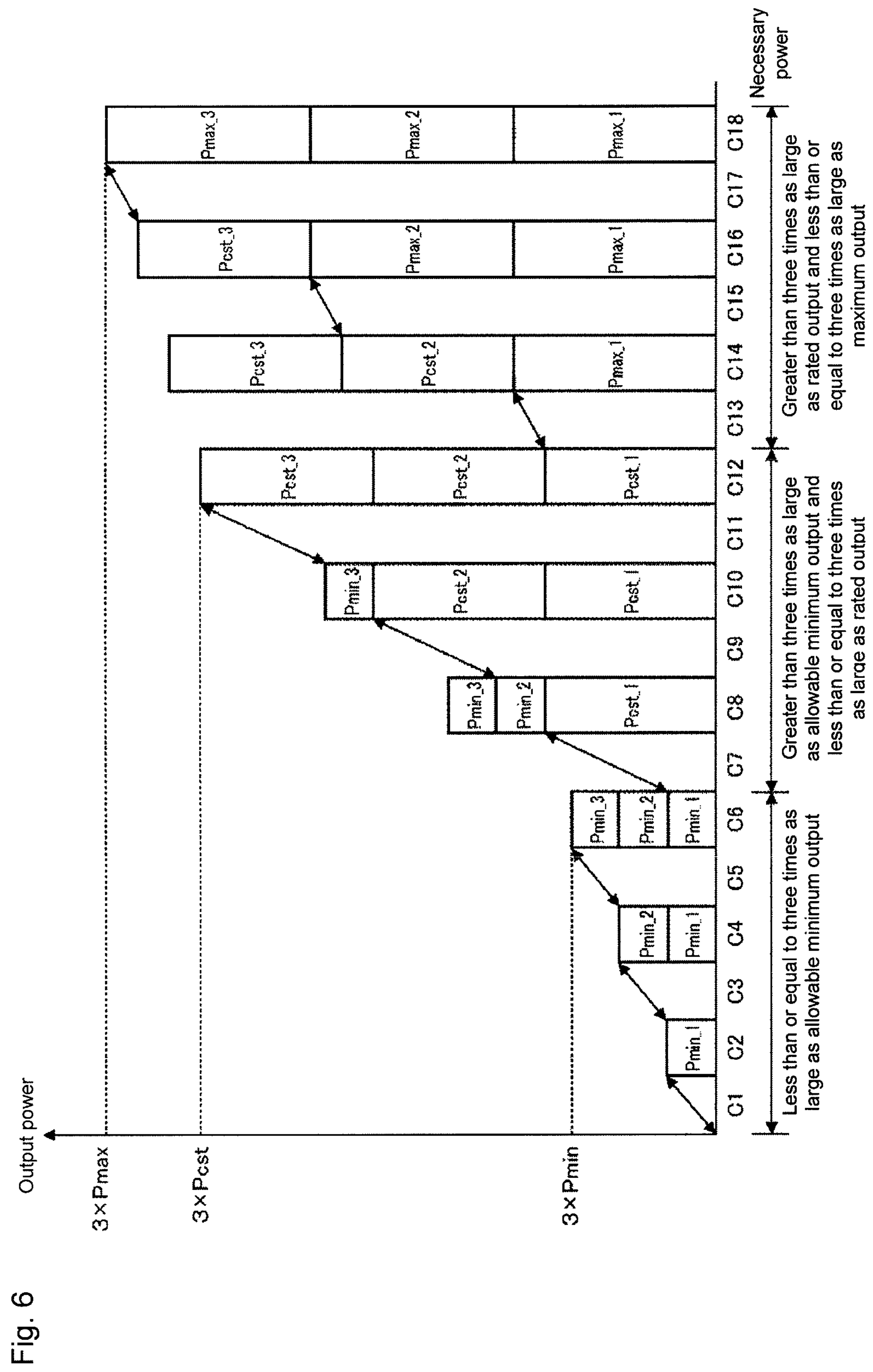
FIG. 6 is a diagram illustrating discharge power setting processing.

The processing in which discharge power setting processor 44 sets the discharge power to three electricity storage devices 12 will be described below with reference to FIG. 6. For three electricity storage devices 12, it is assumed that three electricity storage devices 12 are equal to one another in maximum output Pmax, rated output Pcst, and, allowable minimum output Pmin.

Upon a request from load 16, discharge power setting processor 44 performs the processing based on necessary power Pn necessary to be output from electricity storage system 11. For example, in the case that necessary power Pn is less than or equal to three times as large as allowable minimum output Pmin, discharge power setting processor 44 sets discharge power Pout such that each of three electricity storage devices 12 outputs the power at allowable minimum output Pmin or less.

In the case that necessary power Pn is greater than three times as large as allowable minimum output Pmin and less than or equal to three times as large as rated output Pcst, discharge power setting processor 44 sets discharge power Pout such that each of three electricity storage devices 12 outputs the power in a range from allowable minimum output Pmin to rated output Pcst. In the case that necessary power Pn is greater than three times as large as rated output Pcst and less than or equal to three times as large as maximum output Pmax, discharge power setting processor 44 sets discharge power Pout such that each of three electricity storage devices 12 outputs the power in a range from rated output Pcst to maximum output Pmax.

Discharge power setting processor 44 sets discharge power Pout in each of three electricity storage devices 12 based on the priority corresponding to the discharge order decided by discharge order decision unit 43 with respect to storage battery 21 of electricity storage device 12.

Hereinafter, the output power of electricity storage device 12 having the highest priority is referred to as discharge power Pout_1 as appropriate. Similarly the allowable minimum output is referred to as allowable minimum output Pmin_1, the rated output is referred to as rated output Pcst_1, and the maximum output is referred to as maximum output Pmax_1. The output power of electricity storage device 12 having the second highest priority is referred to as discharge power Pout_2 as appropriate. Similarly the allowable minimum output is referred to as allowable minimum output Pmin_2, the rated output is referred to as rated output Pcst_2, and the maximum output is referred to as maximum output Pmax_2. The output power of electricity storage device 12 having the third highest priority is referred to as discharge power Pout_3 as appropriate. Similarly the allowable minimum output is referred to as allowable minimum output Pmin_3, the rated output is referred to as rated output Pcst_3, and the maximum output is referred to as maximum output Pmax_3.

For example, in case C1 that necessary power Pn is less than allowable minimum output Pmin, discharge power setting processor 44 performs the setting such that discharge power Pout_1 becomes necessary power Pn (Pout_1=Pn). In case C2 that necessary power Pn is equal to allowable minimum output Pmin, discharge power setting processor 44 sets discharge power Pout_1 to allowable minimum output Pmin_1 (Pout_1=Pmin_1).

In case C3 that necessary power Pn is greater than allowable minimum output Pmin and less than two times as large as allowable minimum output Pmin, discharge power setting processor 44 sets discharge power Pout_1 to allowable minimum output Pmin_1 (Pout_1=Pmin_1). Additionally, discharge power setting processor 44 performs the setting such that discharge power Pout_2 becomes a value in which allowable minimum output $Pmin_{\_1}$ is subtracted from necessary power Pn (Pout_2=Pn—Pmin_1).

In case C4 that necessary power Pn is equal to two times as large as allowable minimum output Pmin, discharge power setting processor 44 sets discharge power Pout_1 and discharge power Pout_2 to allowable minimum output Pmin_1 and allowable minimum output Pmin_2 (Pout_1=Pmin_1 and Pout_2=Pmin_2), respectively.

In case C5 that necessary power Pn is greater than two times as large as allowable minimum output Pmin and less than three times as large as allowable minimum output Pmin, discharge power setting processor 44 sets discharge power Pout_1 and discharge power Pout_2 to allowable minimum output Pmin_1 and allowable minimum output Pmin_2 (Pout_1=Pmin_1 and Pout_2=Pmin_2), respectively. Additionally, discharge power setting processor 44 performs the setting such that discharge power Pout_3 becomes a value in which allowable minimum output Pmin_1 and allowable minimum output Pmin_2 are subtracted from necessary power Pn (Pout_3=Pn−Pmin_1 -Pmin_2).

In case C6 that necessary power Pn becomes equal to three times as large as allowable minimum output Pmin, discharge power setting processor 44 sets discharge power Pout_1, discharge power Pout_2, and discharge power Pout_3 to allowable minimum output Pmin_1, allowable minimum output Pmin_2, and allowable minimum output Pmin_3 (Pout_1=Pmin_1, Pout_2=Pmin_2, and Pout_3=Pmin_3), respectively.

In case C7 that necessary power Pn is greater than three times as large as allowable minimum output Pmin and less than a value in which two times as large as allowable minimum output Pmin is added to rated output Pcst, discharge power setting processor 44 performs the setting such that discharge power Pout_1 becomes a value in which allowable minimum output Pmin_2 and allowable minimum output Pmin_3 are subtracted from necessary power Pn (Pout_1=Pn−Pmin_2−Pmin_3). Additionally, discharge power setting processor 44 sets discharge power Pout_2 and discharge power Pout_3 to allowable minimum output Pmin_2 and allowable minimum output Pmin_3 (Pout_2=Pmin_2 and Pout_3=Pmin_3), respectively.

In case C8 that necessary power Pn is equal to a value in which two times as large as allowable minimum output Pmin is added to rated output Pcst, discharge power setting processor 44 sets discharge power Pout_1 to rated output Pcst_1 (Pout_1=Pcst_1), and sets discharge power Pout_2 and discharge power Pout_3 to allowable minimum output Pmin_2 and allowable minimum output Pmin_3 (Pout_2=Pmin_2 and Pout_3=Pmin_3), respectively.

In case C9 that necessary power Pn is greater than a value in which two times as large as allowable minimum output Pmin is added to rated output Pcst and less than a value in which allowable minimum output Pmin is added to two times as large as rated output Pcst, discharge power setting processor 44 performs the setting such that discharge power Pout_2 becomes a value in which rated output Pcst_1 and allowable minimum output Pmin_3 are subtracted from necessary power Pn (Pout_2=Pn−Pcst_1−Pmin_3). Additionally, discharge power setting processor 44 sets discharge power Pout_1 to rated output Pcst_1 (Pout_1=Pcst_1), and sets discharge power Pout_3 to allowable minimum output Pmin_3 (Pout_3=Pmin_3).

In case C10 that necessary power Pn is equal to a value in which allowable minimum output Pmin is added to two times as large as rated output Pcst, discharge power setting processor 44 sets discharge power Pout_1 and discharge power Pout_2 to rated output Pcst_1 and rated output Pcst_2 (Pout_1 =Pcst_1 and Pout_2=Pcst_2), respectively, and sets discharge power Pout_3 to allowable minimum output Pmin_3 (Pout_3=Pmin_3).

In case C11 that necessary power Pn is greater than a value in which allowable minimum output Pmin is added to two times as large as rated output Pcst and less than three times as large as rated output Pcst, discharge power setting processor 44 performs the setting such that discharge power Pout_3 becomes a value in which rated output Pcst_1 and rated output Pcst_2 are subtracted from necessary power Pn (Pout_3=Pn−Pcst_1−Pcst_2). Additionally, discharge power setting processor 44 sets discharge power Pout_1 and discharge power Pout_2 to rated output Pcst_1 and rated output Pcst_2 (Pout_1=Pcst_1 and Pout_2=Pcst_2), respectively.

In case C12 that necessary power Pn is equal to three times as large as rated output Pcst, discharge power setting processor 44 sets discharge power Pout_1, discharge power Pout_2, and discharge power Pout_3 to rated output Pcst_1, rated output Pcst_2, and rated output Pcst_3 (Pout_1=Pcst_1, Pout_2=Pcst_2, and Pout_3=Pcst_3), respectively.

In case C13 that necessary power Pn is greater than three times as large as rated output Pcst and less than a value in which maximum output Pmax is added to two times as large as rated output Pcst, discharge power setting processor 44 performs the setting such that discharge power Pout_1 becomes a value in which rated output Pcst_2 and rated output Pcst_3 are subtracted from necessary power Pn (Pout_1=Pn−Pcst_2−Pcst_3). Additionally, discharge power setting processor 44 sets discharge power Pout_2 and discharge power Pout_3 to rated output Pcst_2 and rated output Pcst_3 (Pout_2=Pcst_2 and Pout_3=Pcst_3), respectively.

In case C14 that necessary power Pn is equal to a value in which maximum output Pmax is added to two times as large as rated output Pcst, discharge power setting processor 44 sets discharge power Pout_1, discharge power Pout_2, and discharge power Pout_3 to maximum output Pmax_1, rated output Pcst_2, and rated output Pcst_3 (Pout_1=Pmax_1, Pout_2=Pcst_2, and Pout_3=Pcst_3), respectively.

In case C15 that necessary power Pn is greater than a value in which maximum output Pmax is added to two times as large as rated output Pcst and less than a value in which two times as large as maximum output Pmax is added to rated output Pcst, discharge power setting processor 44 performs the setting such that discharge power Pout_2 becomes a value in which maximum output Pmax_1 and rated output Pcst_3 are subtracted from necessary power Pn (Pout_2=Pn−Pmax_1−Pcst_3). Additionally, discharge power setting processor 44 sets discharge power Pout_1 to maximum output Pmax_1, and sets discharge power Pout_3 to rated output Pcst_3 (Pout_1=Pmax_1 and Pout_3=Pcst_3).

In case C16 that necessary power Pn is equal to a value in which two times as large as maximum output Pmax is added to rated output Pcst, discharge power setting processor 44 sets discharge power Pout_1, discharge power Pout_2, and discharge power Pout_3 to maximum output Pmax_1, maximum output Pmax_2, and rated output Pcst_3 (Pout_1=Pmax_1, Pout_2=Pmax_2, and Pout_3=Pcst_3), respectively.

In case C17 that necessary power Pn is greater than a value in which two times as large as maximum output Pmax is added to rated output Pcst and less than three times as large as maximum output Pmax, discharge power setting processor 44 performs the setting such that discharge power Pout_3 becomes a value in which maximum output Pmax_1 and maximum output Pmax_2 are subtracted from necessary power Pn (Pout_3=Pn−Pmax_1−Pmax_2). Additionally, discharge power setting processor 44 sets discharge power Pout_1 and discharge power Pout_2 to maximum output Pmax_1 and maximum output Pmax_2 (Pout_1=Pmax_1 and Pout_2=Pmax_2), respectively.

In case C18 that necessary power Pn becomes equal to three times as large as maximum output Pmax, discharge power setting processor 44 sets discharge power Pout_1, discharge power Pout_2, and discharge power Pout_3 to maximum output Pmax_1, maximum output Pmax_2, and maximum output Pmax_3 (Pout_1=Pmax_1, Pout_2=Pmax_2, and Pout_3=Pmax_3), respectively.

Thus, in the case that necessary power Pn is less than or equal to three times as large as allowable minimum output Pmin, discharge power setting processor 44 sets the discharge power such that storage battery 21 having the higher priority preferentially outputs the power at allowable minimum output Pmin and such that the output is preferentially stopped (output becomes 0) from storage battery 21 having the lower priority. In the case that necessary power Pn is greater than three times as large as allowable minimum output Pmin and less than or equal to three times as large as rated output Pcst, discharge power setting processor 44 sets the discharge power such that storage battery 21 having the higher priority preferentially outputs the power at rated output Pcst and such that storage battery 21 having the lower priority preferentially outputs the power at allowable minimum output Pmin. In the case that necessary power Pn is greater than three times as large as rated output Pcst and less than or equal to three times as large as maximum output Pmax, discharge power setting processor 44 sets the discharge power such that storage battery 21 having the higher priority preferentially outputs the power at maximum output Pmax and such that storage battery 21 having the lower priority preferentially outputs the power at rated output Pcst.

A method for controlling the discharges of storage batteries 21-1 to 21-3 will be described below with reference to a flowchart in FIG. 7.

The processing is started in response to start-up of electricity storage system 11. In Step S11, data acquisition unit 42 acquires the pieces of data indicating the states of charge and the charge/discharge frequencies from all storage batteries 21 included in electricity storage system 11. Data acquisition unit 42 supplies the pieces of data indicating the states of charge and the charge/discharge frequencies of storage batteries 21-1 to 21-3 to discharge order decision unit 43.

In Step S12, based on the pieces of data supplied from data acquisition unit 42, discharge order decision unit 43 refers to the discharge order table stored in memory 32, and decides the discharge orders of storage batteries 21-1 to 21-3 in the way described above with reference to FIG. 4.

In Step S13, discharge order decision unit 43 determines whether the discharge order is decided with respect to all storage batteries 21-1 to 21-3. When discharge order decision unit 43 determines that the discharge order is not decided with respect to all storage batteries 21-1 to 21-3, the processing returns to Step S11, and the similar processing is repeated.

On the other hand, when discharge order decision unit 43 determines that the discharge order is decided with respect to all storage batteries 21-1 to 21-3 in Step S13, the processing goes to Step S14.

In Step S14, discharge order decision unit 43 supplies the discharge orders of storage batteries 21-1 to 21-3, which are decided in Step S12, to discharge power setting processor 44. In response to the discharge orders supplied from discharge order decision unit 43, discharge power setting processor 44 performs the discharge power setting processing of setting the discharge power output from each of storage batteries 21-1 to 21-3. In the case that a plurality of storage batteries 21 have the same discharge order, for example, discharge power setting processor 44 compares the charge/discharge frequencies of storage batteries 21 to each other, and performs the discharge power setting processing while giving the higher priority to storage battery 21 having the lower charge/discharge frequency.

In Step S15, discharge power setting processor 44 notifies discharge instruction unit 45 of the discharge power of each of storage batteries 21-1 to 21-3. The discharge power is set in the discharge power setting processing in Step S14. Discharge instruction unit 45 sends the control signal issuing the instruction to start the output at the set discharge power to discharge units 23-1 to 23-3, and each of storage batteries 21-1 to 21-3 starts the output at the set discharge power.

In Step S16, determination unit 46 determines whether discharge order decision unit 43 performs the discharge order decision processing based on the pieces of data indicating the states of charge of storage batteries 21-1 to 21-3, which are periodically acquired by data acquisition unit 42. For example, as described above with reference to FIG. 4, determination unit 46 determines that discharge order decision unit 43 performs the discharge order decision processing in the case that the state of charge of storage battery 21 in discharge becomes less than the second threshold.

In Step S16, the processing waits until determination unit 46 determines that discharge order decision unit 43 performs the discharge order decision processing. When it is determined that discharge order decision unit 43 performs the discharge order decision processing in Step S16, the processing returns to Step S11, and the similar processing is repeated.

Thus, in electricity storage system 11, the discharge order based on which storage batteries 21-1 to 21-3 perform the discharges can be decided based on the states of charge and the charge/discharge frequencies of storage batteries 21-1 to 21-3, and the priority of the discharge is decided according to the discharge order as described with reference to FIG. 4. Therefore, electricity storage system 11 can exert the better performance as a whole system because the discharge can be performed with a good balance between the lives of storage batteries 21-1 to 21-3 and the states of charge of storage batteries 21-1 to 21-3. In electricity storage system 11, the discharge orders of storage batteries 21-1 to 21-3 are decided using the discharge order table in which the discharge order is set based on the state of charge and the charge/discharge frequency. Therefore, the discharge order can be decided by the simpler processing.

Figure 7:
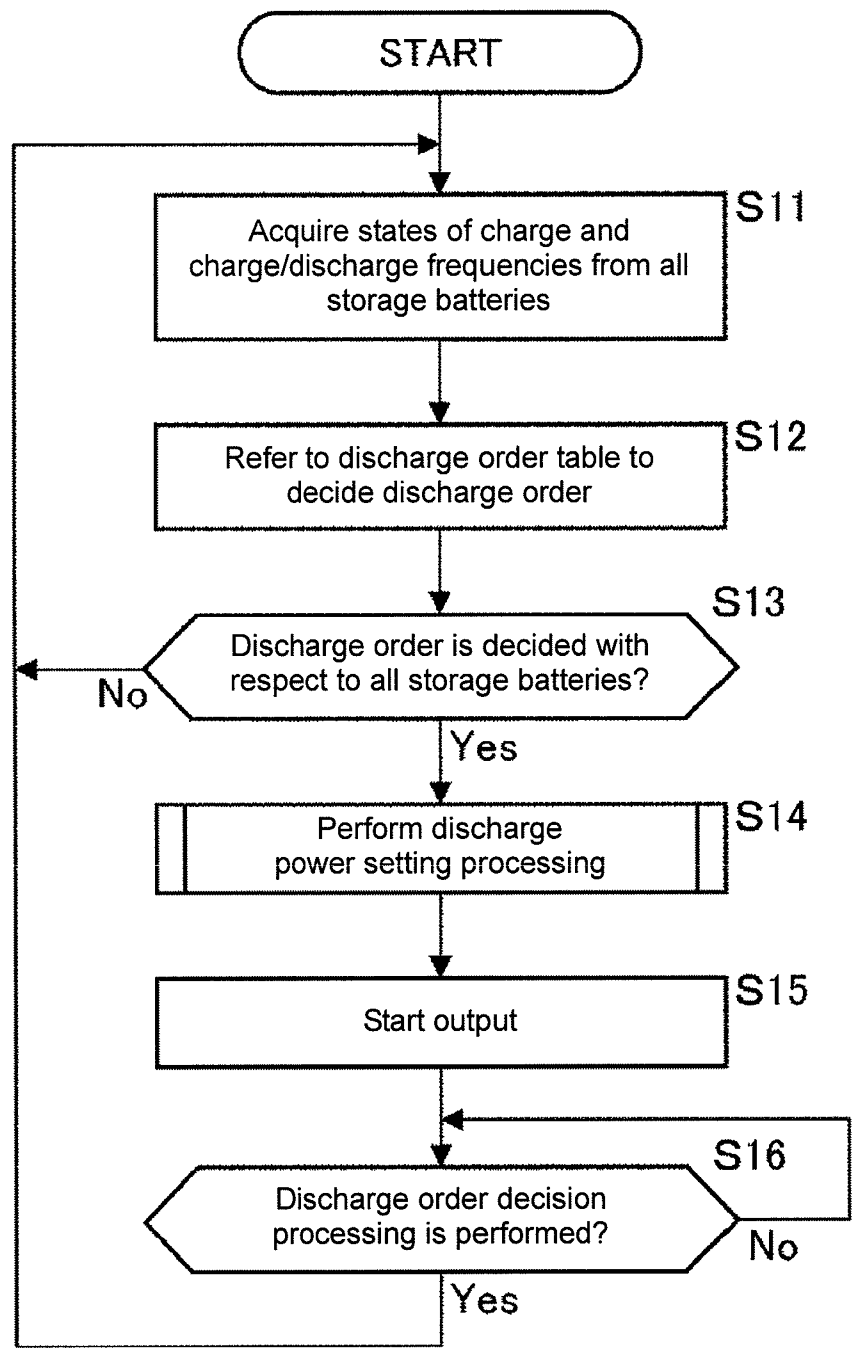
FIG. 7 is a flowchart illustrating a method for controlling discharge of the storage battery.
Figure 8:
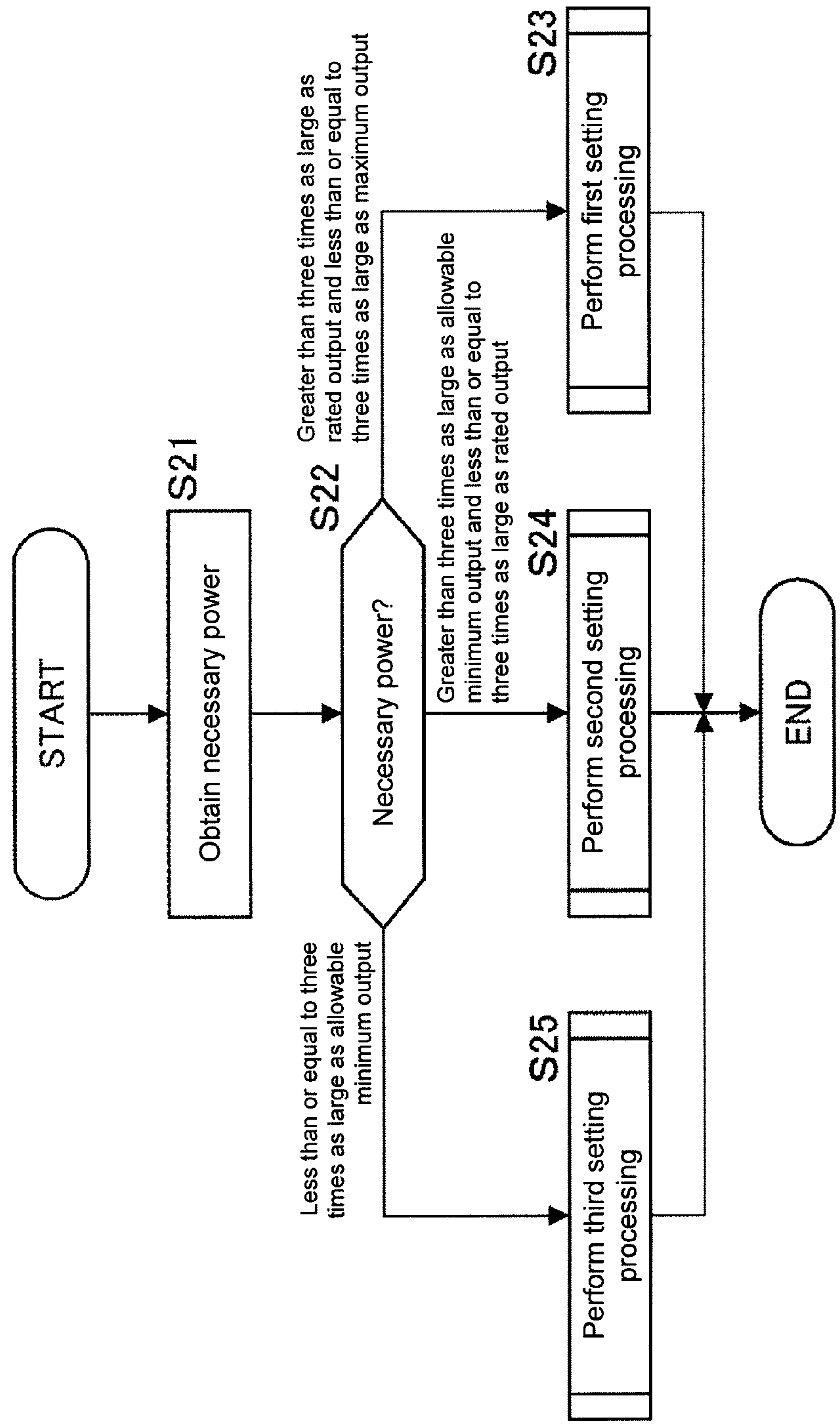
FIG. 8 is a flowchart illustrating the discharge power setting processing.

FIG. 8 is a flowchart illustrating the discharge power setting processing in Step S14 of FIG. 7.

In Step S21, upon the request from load 16, discharge power setting processor 44 obtains necessary power Pn necessary to be output from electricity storage system 11.

In Step S22, discharge power setting processor 44 determines which one of a range greater than three times as large as rated output Pcst and less than or equal to three times as large as maximum output Pmax, a range greater than three times as large as allowable minimum output Pmin and less than or equal to three times as large as rated output Pcst, and a range less than or equal to three times as large as allowable minimum output Pmin includes necessary power Pn obtained in Step S21.

When discharge power setting processor 44 determines that necessary power Pn is greater than three times as large as rated output Pcst and less than or equal to three times as large as maximum output Pmax in Step S22, the processing goes to Step S23 to perform first setting processing of setting the discharge power.

On the other hand, when discharge power setting processor 44 determines that necessary power Pn is greater than three times as large as allowable minimum output Pmin and less than or equal to three times as large as rated output Pcst in Step S22, the processing goes to Step S24 to perform second setting processing of setting the discharge power.

On the other hand, when discharge power setting processor 44 determines that necessary power Pn is less than or equal to three times as large as allowable minimum output Pmin in Step S22, the processing goes to Step S25 to perform third setting processing of setting the discharge power.

The discharge power setting processing is ended after the pieces of processing in Steps S23 to S25, and the processing goes to Step S15 in FIG. 7.

Figure 9:
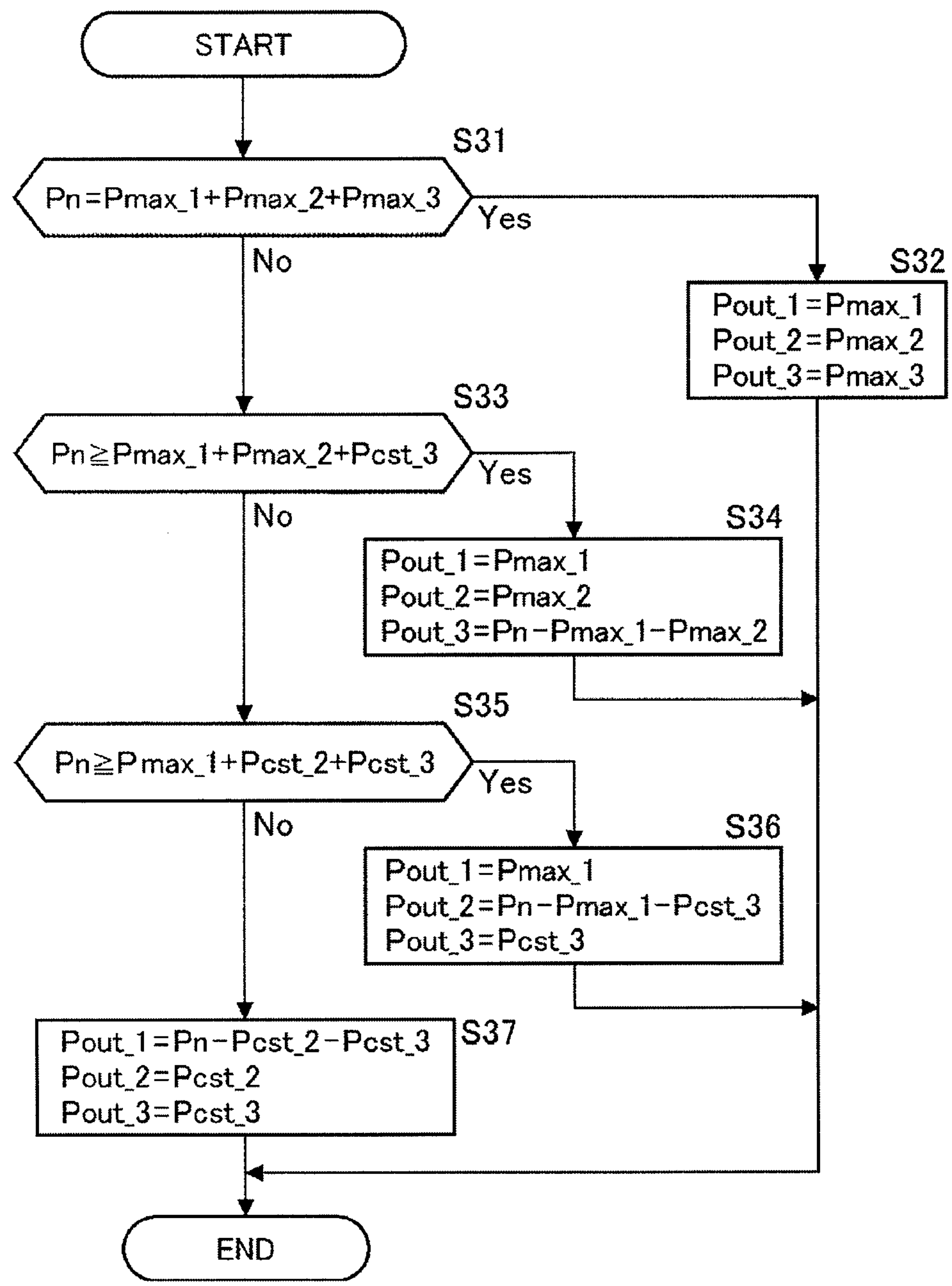
FIG. 9 is a flowchart illustrating first setting processing.

FIG. 9 is a flowchart illustrating the first setting processing in Step S23 of FIG. 8.

In Step S31, discharge power setting processor 44 determines whether necessary power Pn is equal to a value in which maximum output Pmax_1, maximum output Pmax_2, and maximum output Pmax_3 are added to one another.

When discharge power setting processor 44 determines that necessary power Pn is equal to the value in which maximum output Pmax_1, maximum output Pmax_2, and maximum output Pmax_3 are added to one another (Pn=Pmax_1+Pmax_2+Pmax_3) in Step S31, the processing goes to Step S32. In Step S32, discharge power setting processor 44 sets discharge power Pout_1, discharge power Pout_2, and discharge power Pout_3 to maximum output Pmax_1, maximum output Pmax_2, and maximum output Pmax_3 (Pout_1=Pmax_1, Pout_2=Pmax_2, and Pout_3=Pmax_3), respectively. That is, in this case, the processing corresponding to case C18 in FIG. 6 is performed.

On the other hand, when discharge power setting processor 44 determines that necessary power Pn is not equal to the value in which maximum output Pmax_1, maximum output Pmax_2, and maximum output Pmax_3 are added to one another in Step S31, the processing goes to Step S33.

In Step S33, discharge power setting processor 44 determines whether necessary power Pn is greater than or equal to a value in which maximum output Pmax_1, maximum output Pmax_2, and rated output Pcst_3 are added to one another. When discharge power setting processor 44 determines that necessary power Pn is greater than or equal to the value in which maximum output Pmax_1, maximum output Pmax_2, and rated output Pcst_3 are added to one another (Pmax_1+Pmax_2+Pmax_3>Pn Pmax_1 +Pmax_2+Pcst_3) in Step S33, the processing goes to Step S34.

In Step S34, discharge power setting processor 44 sets discharge power Pout_1 and discharge power Pout_2 to maximum output Pmax_1 and maximum output Pmax_2 (Pout_1=Pmax_1 and Pout_2=Pmax_2), respectively. Discharge power setting processor 44 performs the setting such that discharge power Pout_3 becomes a value in which maximum output Pmax_1 and maximum output Pmax_2 are subtracted from necessary power Pn (Pout_3=Pn−Pmax_1−Pmax_2). That is, in this case, the pieces of processing corresponding to cases C16 and C17 in FIG. 6 are performed.

On the other hand, when discharge power setting processor 44 determines that necessary power Pn is less than the value in which maximum output Pmax_1, maximum output Pmax_2, and rated output Pcst_3 are added to one another in Step S33 (Pmax_1+Pmax_2+Pcst_3>Pn), the processing goes to Step S35.

In Step S35, discharge power setting processor 44 determines whether necessary power Pn is greater than or equal to a value in which maximum output Pmax_1, rated output Pcst_2, and rated output Pcst_3 are added to one another. When discharge power setting processor 44 determines that necessary power Pn is greater than or equal to the value in which maximum output Pmax_1, rated output Pcst_2, and rated output Pcst_3 are added to one another (Pmax_1+Pmax_2+Pcst_3>Pn Pmax_1+Pcst_2+Pcst_3) in Step S35, the processing goes to Step S36.

In Step S36, discharge power setting processor 44 sets discharge power Pout_1 and discharge power Pout_3 to maximum output Pmax_1 and rated output Pcst_3 (Pout_1=Pmax_1 and Pout_3=Pcst_3), respectively. Discharge power setting processor 44 performs the setting such that discharge power Pout_2 becomes a value in which maximum output Pmax_1 and rated output Pcst_3 are subtracted from necessary power Pn (Pout_2=Pn−Pmax_1−Pcst_3). That is, in this case, the pieces of processing corresponding to cases C14 and C15 in FIG. 6 are performed.

On the other hand, when discharge power setting processor 44 determines that necessary power Pn is less than the value in which maximum output Pmax_1, rated output Pcst_2, and rated output Pcst_3 are added to one another (Pmax_1+Pcst_2+Pcst_3>Pn>Pcst_1+Pcst_2+Pcst_3) in Step S35, the processing goes to Step S37.

In Step S37, discharge power setting processor 44 sets discharge power Pout_2 and discharge power Pout_3 to rated output Pcst_2 and rated output Pcst_3 (Pout_2=Pcst_2 and Pout_3=Pcst_3), respectively. Discharge power setting processor 44 performs the setting such that discharge power Pout_1 becomes a value in which rated output Pcst_2 and rated output Pcst_3 are subtracted from necessary power Pn (Pout_1=Pn−Pcst_2−Pcst_3). That is, in this case, the processing corresponding to case C13 in FIG. 6 is performed.

The first setting processing is ended after the pieces of processing in Steps S32, S34, S36, and S37.

Figure 10:
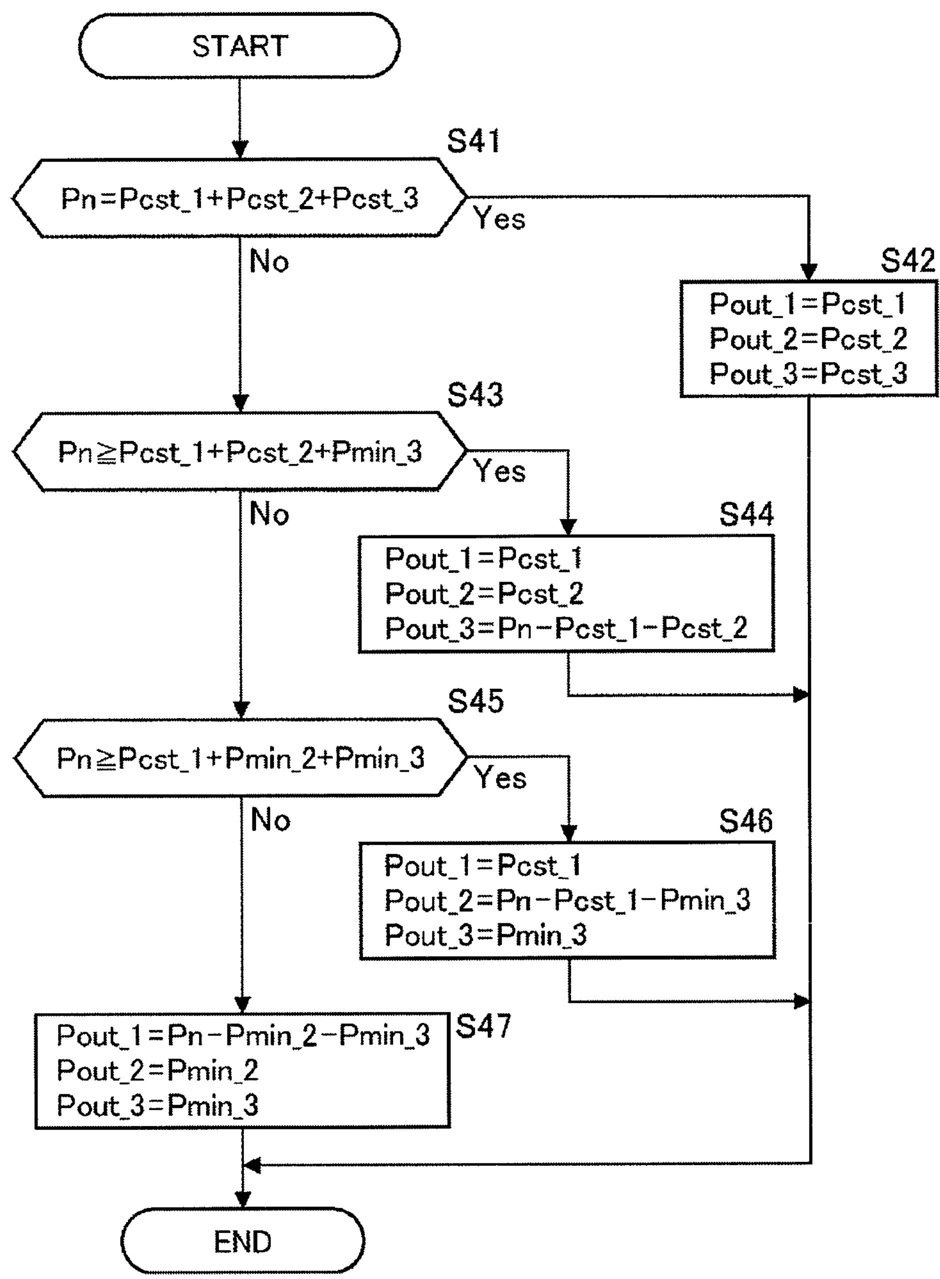
FIG. 10 is a flowchart illustrating second setting processing.

FIG. 10 is a flowchart illustrating the second setting processing in Step S24 of FIG. 8.

In Step S41, discharge power setting processor 44 determines whether necessary power Pn is equal to a value in which rated output Pcst_1, rated output Pcst_2, and rated output Pcst_3 are added to one another.

When discharge power setting processor 44 determines that necessary power Pn is equal to the value in which rated output Pcst_1, rated output Pcst_2, and rated output Pcst_3 are added to one another (Pn=Pcst_1+Pcst_2+Pcst_3) in Step S31, the processing goes to Step S42. In Step S42, discharge power setting processor 44 sets discharge power Pout_1, discharge power Pout_2, and discharge power Pout_3 to rated output Pcst_1, rated output Pcst_2, and rated output Pcst_3 (Pout_1=Pcst_1, Pout_2=Pcst_2, and Pout_3=Pcst_3), respectively. That is, in this case, the processing corresponding to case C12 in FIG. 6 is performed.

On the other hand, when discharge power setting processor 44 determines that necessary power Pn is not equal to the value in which rated output Pcst_1, rated output Pcst_2, and rated output Pcst_3 are added to one another in Step S41, the processing goes to Step S43.

In Step S43, discharge power setting processor 44 determines whether necessary power Pn is greater than or equal to a value in which rated output Pcst_1, rated output Pcst_2, and allowable minimum output Pmin_3 are added to one another. When discharge power setting processor 44 determines that necessary power Pn is greater than or equal to the value in which rated output Pcst_1, rated output Pcst_2, and allowable minimum output Pmin_3 are added to one another (Pcst_1+Pcst_2+Pcst_3>Pn Pcst_1+Pcst_2+Pmin_3) in Step S43, the processing goes to Step S44.

In Step S44, discharge power setting processor 44 sets discharge power Pout_1 and discharge power Pout_2 to rated output Pcst_1 and rated output Pcst_2 (Pout_1=Pcst_1 and Pout_2=Pcst_2), respectively. Discharge power setting processor 44 performs the setting such that discharge power Pout_3 becomes a value in which rated output Pcst_1 and rated output Pcst_2 are subtracted from necessary power Pn (Pout_3=Pn−Pcst_1−Pcst_2). That is, in this case, the pieces of processing corresponding to cases C10 and C11 in FIG. 6 are performed.

On the other hand, when discharge power setting processor 44 determines that necessary power Pn is less than the value in which rated output Pcst_1, rated output Pcst_2, and allowable minimum output Pmin_3 are added to one another (Pcst_1+Pcst_2+Pmin_3>Pn) in Step S43, the processing goes to Step S45.

In Step S45, discharge power setting processor 44 determines whether necessary power Pn is greater than or equal to a value in which rated output Pcst_1, allowable minimum output Pmin_2, and allowable minimum output Pmin_3 are added to one another. When discharge power setting processor 44 determines that necessary power Pn is greater than or equal to the value in which rated output Pcst_1, allowable minimum output Pmin_2, and allowable minimum output Pmin_3 are added to one another (Pcst_1+Pcst_2+Pmin_3>Pn Pcst_1+Pmin_2+Pmin_3) in Step S45, the processing goes to Step S46.

In Step S46, discharge power setting processor 44 sets discharge power Pout_1 and discharge power Pout_3 to rated output Pcst_1 and allowable minimum output Pmin_3 (Pout_1=Pcst_1 and Pout_3=Pmin_3), respectively. Discharge power setting processor 44 performs the setting such that discharge power Pout_2 becomes a value in which rated output Pcst_1 and allowable minimum output Pmin_3 are subtracted from necessary power Pn (Pout_2=Pn−Pcst_1−Pmin_3). That is, in this case, the pieces of processing corresponding to cases C8 and C9 in FIG. 6 are performed.

On the other hand, when discharge power setting processor 44 determines that necessary power Pn is less than the value in which rated output Pcst_1, allowable minimum output Pmin_2, and allowable minimum output Pmin_3 are added to one another (Pcst_1+Pmin_2+Pmin_3>Pn>Pmin_1+Pmin_2+Pmin_3) in Step S45, the processing goes to Step S47.

In Step S47, discharge power setting processor 44 sets discharge power Pout_2 and discharge power Pout_3 to allowable minimum output Pmin_2 and allowable minimum output Pmin_3 (Pout_2=Pmin_2 and Pout_3=Pmin_3), respectively. Discharge power setting processor 44 performs the setting such that discharge power Pout_1 becomes a value in which allowable minimum output Pmin_2 and allowable minimum output Pmin_3 are subtracted from necessary power Pn (Pout_1=Pn−Pmin_2−Pmin_3). That is, in this case, the processing corresponding to case C7 in FIG. 6 is performed.

The second setting processing is ended after the pieces of processing in Steps S42, S44, S46, and S47.

Figure 11:
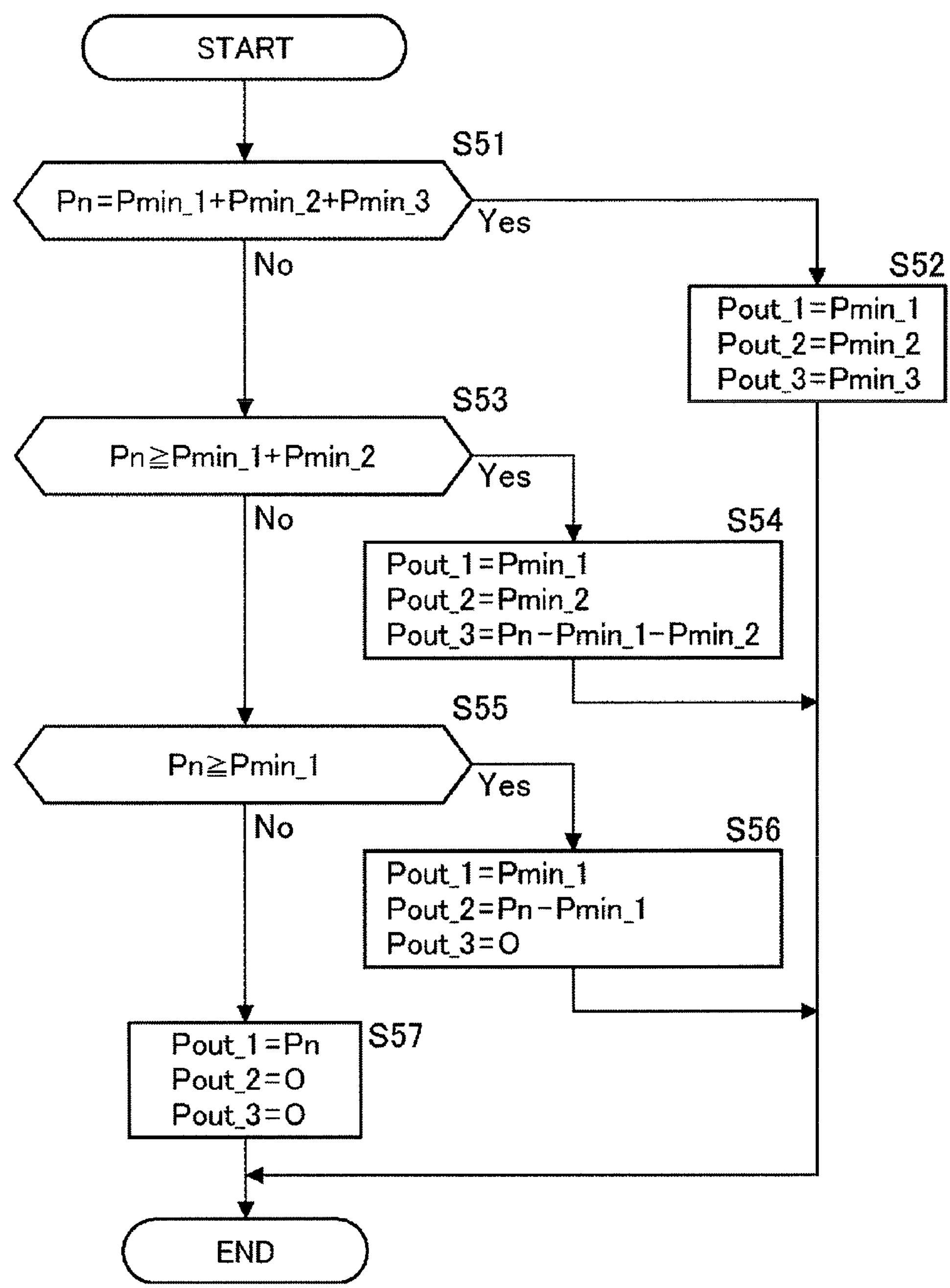
FIG. 11 is a flowchart illustrating third setting processing.

FIG. 11 is a flowchart illustrating the third setting processing in Step S25 of FIG. 8.

In Step S51, discharge power setting processor 44 determines whether necessary power Pn is equal to a value in which allowable minimum output Pmin_1, allowable minimum output Pmin_2, and allowable minimum output Pmin_3 are added to one another.

When discharge power setting processor 44 determines that necessary power Pn is equal to the value in which allowable minimum output Pmin_1, allowable minimum output Pmin_2, and allowable minimum output Pmin_3 are added to one another (Pn=Pmin_1+Pmin_2+Pmin_3) in Step S51, the processing goes to Step S52. In Step S52, discharge power setting processor 44 sets discharge power Pout_1, discharge power Pout_2, and discharge power Pout_3 to allowable minimum output Pmin_1, allowable minimum output Pmin_2, and allowable minimum output Pmin_3 (Pout_1=Pmin_1, Pout_2=Pmin_2, and Pout_3=Pmin_3), respectively. That is, in this case, the processing corresponding to case C6 in FIG. 6 is performed.

On the other hand, when discharge power setting processor 44 determines that necessary power Pn is not equal to the value in which allowable minimum output Pmin_1, allowable minimum output Pmin_2, and allowable minimum output Pmin_3 are added to one another in Step S51, the processing goes to Step S53.

In Step S53, discharge power setting processor 44 determines whether necessary power Pn is greater than or equal to a value in which allowable minimum output Pmin_1 is added to allowable minimum output Pmin_2. When discharge power setting processor 44 determines that necessary power Pn is greater than or equal to the value in which allowable minimum output Pmin_1 is added to allowable minimum output Pmin_2 (Pmin_1 +Pmin_2+Pmin_3>Pn Pmin_1+Pmin_2) in Step S53, the processing goes to Step S54.

In Step S54, discharge power setting processor 44 sets discharge power Pout_1 and discharge power Pout_2 to allowable minimum output Pmin_1 and allowable minimum output Pmin_2 (Pout_1=Pmin_1 and Pout_2=Pmin_2), respectively. Discharge power setting processor 44 performs the setting such that discharge power Pout_3 becomes a value in which allowable minimum output Pmin_1 and allowable minimum output Pmin_2 are subtracted from necessary power Pn (Pout_3=Pn−Pmin_1−Pmin_2). That is, in this case, the pieces of processing corresponding to cases C4 and C5 in FIG. 6 are performed.

On the other hand, when discharge power setting processor 44 determines that necessary power Pn is less than the value in which allowable minimum output Pmin_1 is added to allowable minimum output Pmin_2 (Pcst_1 +Pcst_2>Pn) in Step S53, the processing goes to Step S55.

In Step S55, discharge power setting processor 44 determines whether necessary power Pn is greater than or equal to allowable minimum output Pmin_1. When discharge power setting processor 44 determines that necessary power Pn is greater than or equal to allowable minimum output Pmin_1 in Step S55 (Pmin_1+Pmin_2>Pn Pmin_1), the processing goes to Step S56.

In Step S56, discharge power setting processor 44 sets discharge power Pout_1 to allowable minimum output Pmin_1, and sets discharge power Pout_2 to 0 (Pout_1=Pmin_1 and Pout_3=0). Discharge power setting processor 44 performs the setting such that discharge power Pout_2 becomes a value in which allowable minimum output Pmin_1 is subtracted from necessary power Pn (Pout_2=Pn−Pmin_1). That is, in this case, the pieces of processing corresponding to cases C2 and C3 in FIG. 6 are performed.

On the other hand, when discharge power setting processor 44 determines that necessary power Pn is less than allowable minimum output Pmin_1 in Step S55 (Pmin_1>Pn), the processing goes to Step S57.

In Step S57, discharge power setting processor 44 sets discharge power Pout_2 and discharge power Pout_3 to 0 ($Pout_{\_2}$=0 and $Pout_{\_3}$=0). Discharge power setting processor 44 performs the setting such that discharge power Pout_1 becomes necessary power Pn (Pout_1=Pn). That is, in this case, the processing corresponding to case C1 in FIG. 6 is performed.

The third setting processing is ended after the pieces of processing in Steps S52, S54, S56, and S57.

Thus, in order to supply the necessary power necessary to be output upon the request from load 16, discharge power setting processor 44 sets the discharge power output from each of storage batteries 21-1 to 21-3 based on the discharge orders decided by discharge order decision unit 43 and maximum output Pmax, rated output Pcst, and allowable minimum output Pmin. Therefore; discharge power setting processor 44 can set the discharge power such that the power is avoided being output at allowable minimum output Pmin or less and such that the power is output at rated output Pcst with which efficiency is improved as much as possible.

Accordingly, electricity storage system 11 can output the power with better conversion efficiency in all storage batteries 21-1 to 21-3 while taking into account the balance between the lives of storage batteries 21-1 to 21-3 and the states of charge of storage batteries 21-1 to 21-3, and electricity storage system 11 can exert the better performance.

As described above, in electricity storage system 11, the order based on which storage batteries 21-1 to 21-3 perform the discharges is decided based on the states of charge and the charge/discharge frequencies of storage batteries 21-1 to 21-3, which allows the discharge to be performed with the good balance between the lives of storage batteries 21-1 to 21-3 and the states of charge of storage batteries 21-1 to 21-3.

That is, in electricity storage system 11, the discharges are performed from storage batteries 21-1 to 21-3 such that the charge/discharge frequency of any one of storage batteries 21-1 to 21-3 does not stand out and such that fluctuation of the state of charge is not generated in storage batteries 21-1 to 21-3. Therefore, the performance degradation as the whole system including cases where the lives of storage batteries 21-1 to 21-3 fluctuate and where a time for which electricity storage system 11 can be driven with maximum capacity during power outage is shortened can be avoided.

That is, electricity storage system 11 can exert the better performance, because the time for which electricity storage system 11 can be driven with the maximum capacity during the power outage can be lengthened while the lives of storage batteries 21-1 to 21-3 are averaged to expand the life of the whole system.

Figure 12:
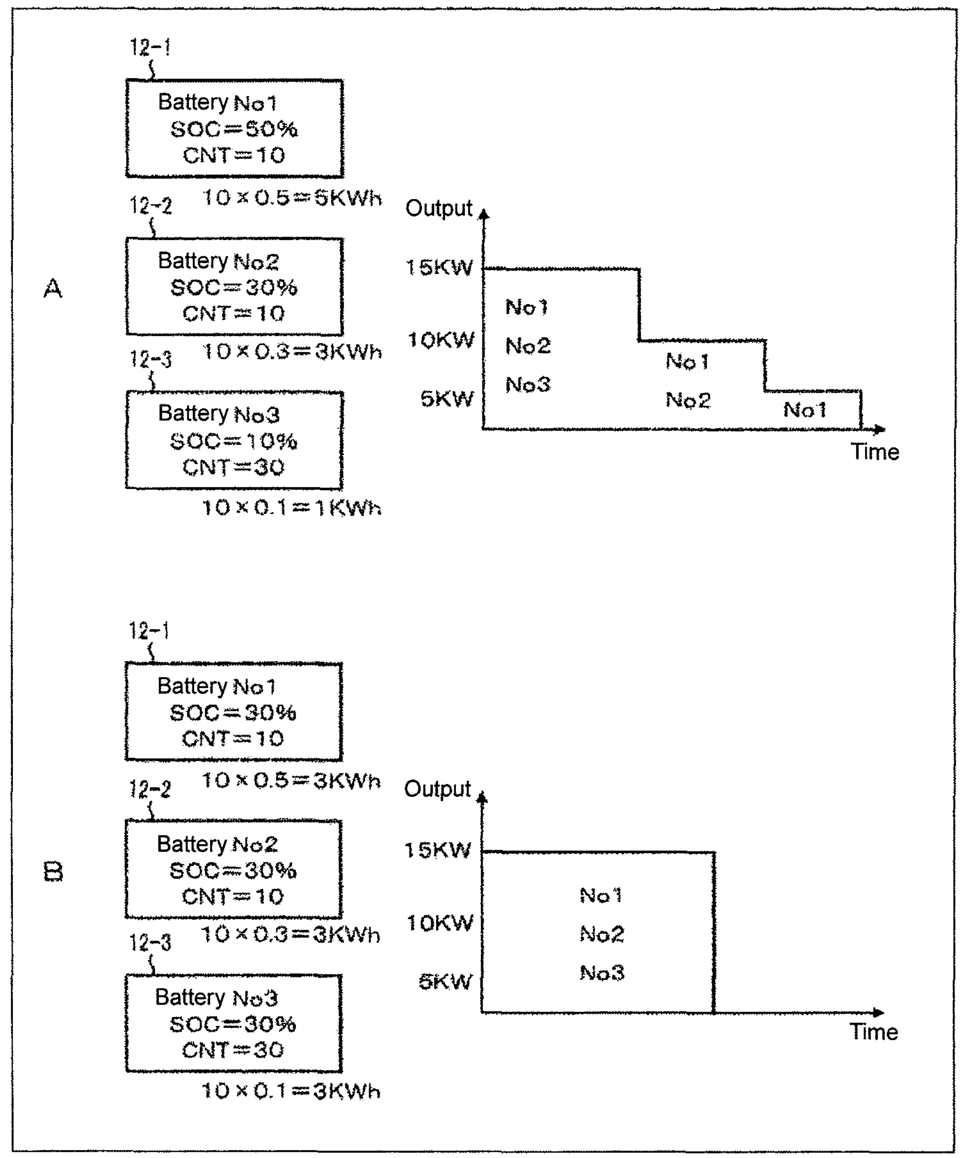
FIGS. 12A and 12B are diagrams illustrating a time for which the electricity storage system can be driven with maximum capacity during power outage.

The lengthening of the time for which electricity storage system 11 can be driven with the maximum capacity during the power outage will be described with reference to FIG. 12.

FIG. 12A illustrates storage batteries 21-1 to 21-3 in which the states of charge fluctuate, and FIG. 12B illustrates storage batteries 21-1 to 21-3 in which the states of charge do not fluctuate.

For example, as illustrated in FIG. 12A, it is assumed that storage battery 21-1 has the state of charge of 50%, that storage battery 21-2 has the state of charge of 30%, and that storage battery 21-3 has the state of charge of 10%. In this case, assuming that the capacity of 10 KWh can be stored in storage batteries 21-1 to 21-3, the capacity of 5 KWh is stored in storage battery 21-1, the capacity of 3 KWh is stored in storage battery 21-3, and the capacity of 1 KWh is stored in storage battery 21-3.

When the fluctuation in state of charge is generated in storage batteries 21-1 to 21-3, as illustrated in a graph on the right side of FIG. 12A, electricity storage system 11 can be driven at 15 KW that is of the maximum capacity of the whole of storage batteries 21-1 to 21-3 until the power stored in storage battery 21-3 is consumed. Then, electricity storage system 11 is driven at 10 KW until the power stored in storage battery 21-2 is consumed, and electricity storage system 11 is driven at 5 KW only by storage battery 21-1.

On the other hand, as illustrated in FIG. 12B, it is assumed that storage batteries 21-1 to 21-3 uniformly have the state of charge of 30%. In this case, assuming that the capacity of 10 KWh can be stored in storage batteries 21-1 to 21-3, the capacity of 3 KWh is stored in each of storage batteries 21-1 to 21-3.

When the fluctuation in state of charge is not generated in storage batteries 21-1 to 21-3, as illustrated in a graph on the right side of FIG. 12B, electricity storage system 11 can be driven at 15 KW that is of the maximum capacity of the whole of storage batteries 21-1 to 21-3 until the power stored in the whole of storage batteries 21-1 to 21-3 is consumed. That is, storage batteries 21-1 to 21-3 can output the power at 15 KW until the power stored in each of storage batteries 21-1 to 21-3 is completely consumed.

Even if storage batteries 21-1 to 21-3 have the total capacity (area of graph) of 9 KWh in both the examples in FIGS. 12A and 12B, the time for which electricity storage system 11 can be driven at 15 KW that is of the maximum capacity of the whole of storage batteries 21-1 to 21-3 is longer when the fluctuation in state of charge is not generated in storage batteries 21-1 to 21-3.

As described above, in electricity storage system 11, because the discharge orders of storage batteries 21-1 to 21-3 are decided by referring to the discharge order table in which the discharge order is set based on the state of charge, the generation of the fluctuation can be prevented in the discharge orders of storage batteries 21-1 to 21-3, and the discharge can be performed such that the state of charge is more uniform. Accordingly, in electricity storage system 11, the time for which electricity storage system 11 can be driven with the maximum capacity can be lengthened even during the power outage.

Figure 13:
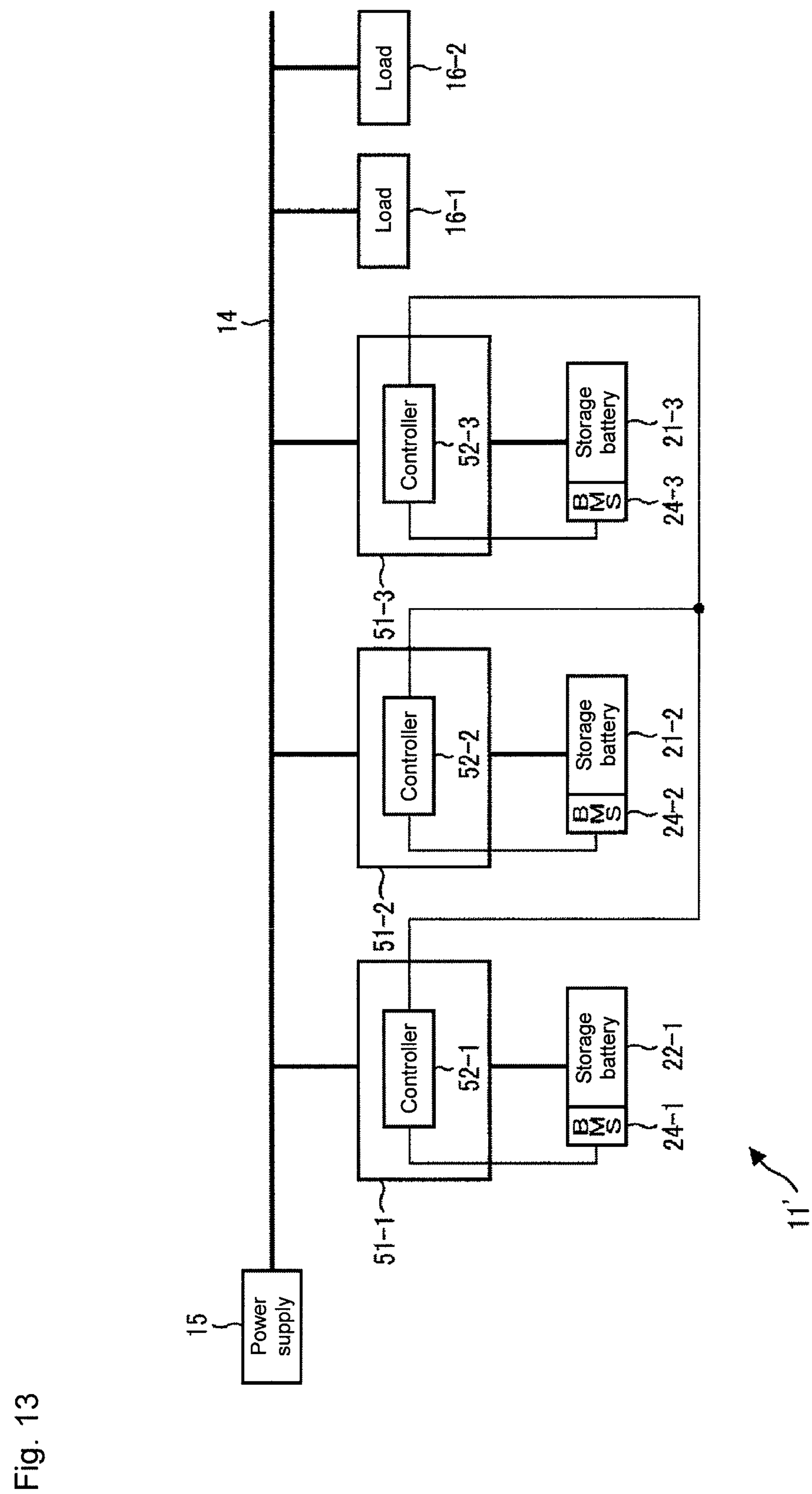
FIG. 13 is a block diagram illustrating a configuration example of an electricity storage system according to a second embodiment to which the technology of the disclosure is applied.

FIG. 13 is a block diagram illustrating a configuration example of an electricity storage system according to a second embodiment to which the technology of the disclosure is applied.

In electricity storage system 11' of FIG. 13, the same component as a component in electricity storage system 11 in FIG. 1 is designated by the same symbol, and the detailed description is neglected. Electricity storage system 11' includes storage batteries 21-1 to 21-3 and battery management systems 24-1 to 24-3, and electricity storage system 11' is identical to electricity storage system 11 in FIG. 1 in that power supply 15 and loads 16-1 and 16-2 are connected to each other via power wiring 14.

However, electricity storage system 11' differs from electricity storage system 11 in FIG. 1 in that electricity storage system 11' includes power conditioners 51-1 to 51-3, that power conditioners 51-1 to 51-3 include controllers 52-1 to 52-3, and that storage batteries 21-1 to 21-3 are connected to power wiring 14 via power conditioners 51-1 to 51-3. Power conditioners 51-1 to 51-3 have the same configuration, and power conditioners 51-1 to 51-3 are collectively referred to as power conditioner 51 unless necessary to distinguish them from each other. The same holds true for controller 52.

Power conditioners 51-1 to 51-3 adjust the power input to and output from storage batteries 21-1 to 21-3 according to the states of charge of storage batteries 21-1 to 21-3, charge storage batteries 21-1 to 21-3, and discharge the power from storage batteries 21-1 to 21-3.

Each of controllers 52-1 to 52-3 is connected to corresponding one of battery management systems 24-1 to 24-3 via communication wirings, and controllers 52-1 to 52-3 are also connected to one another via communication wirings. Each of controllers 52-1 to 52-3 acquires the pieces of data indicating the state of charge and the charge/discharge frequency of corresponding one of storage batteries 21-1 to 21-3 from corresponding one of battery management systems 24-1 to 24-3. Controllers 52-1 to 52-3 conduct communication with one another to decide the discharge orders of storage batteries 21-1 to 21-3, and perform the discharges.

That is, each of controllers 52-1 to 52-3 refers to the discharge order table to decide the discharge order of corresponding one of storage batteries 21-1 to 21-3. Controllers 52-1 to 52-3 compare the discharge orders thereof to one another, and controller 52 corresponding to storage battery 21 with the highest priority of the discharge order discharges the power from this storage battery 21. When the state of charge of storage battery 21 in discharge becomes less than the second threshold, controller 52 corresponding to this storage battery 21 in discharge notifies other controllers 52 to perform the discharge order decision processing, and the discharge order is decided again.

Thus, similarly to electricity storage system 11, electricity storage system 11' can exert the better performance as the whole system without including control device 13 controlling the whole of electricity storage system 11.

In the second embodiment, the discharge orders are previously set in the discharge order table stored in memory 32, and CPU 33 refers to the discharge order table to decide the discharge orders of storage batteries 21-1 to 21-3. Alternatively, CPU 33 may decide the discharge orders without referring to the discharge order table. For example, CPU 33 can decide the discharge orders of storage batteries 21-1 to 21-3 using a criterion in which the discharge order is previously set based on the charge/discharge frequencies and the states of charge of storage batteries 21-1 to 21-3 similarly to the discharge order table.

For example, CPU 33 makes the decision based on the criterion in which the predetermined charge/discharge frequencies CNT0 to CNT6 and the states of charge SOC0 to SOC6 are used, whereby CPU 33 can decide the discharge order based on which one of the ranges segmented by CNT(n) to CNT(n+1) (n=0 to 5) includes the charge/discharge frequency of storage battery 21 and which one of the ranges segmented by constant CNT(m) to CNT(m+1) (m=0 to 5) includes the state of charge of storage battery 21.

In addition to the charge/discharge frequency, one of or both the charge frequency and the discharge frequency may be used as a parameter deciding the discharge order of storage battery 21. In addition to the state of charge of storage battery 21, a voltage at storage battery 21 may be used as the parameter deciding the discharge order of storage battery 21. For the use of the parameter, the discharge order is decided by referring to the discharge order table that is produced according to each parameter.

The string of pieces of processing can be performed by either hardware or software. In the case that the string of pieces of processing is performed by the software, for example, a program constituting the software is installed from a program recording medium into a computer incorporated in dedicated hardware or a general-purpose personal computer in which various functions can be performed by installing various programs.

The program can previously be stored in a storage, or installed in the computer via a communication unit including a network interface or a drive device that drives a removable medium such as a magnetic disk (including a flexible disk), an optical disk (such as a CD-ROM (Compact Disc-Read Only Memory), and a DVD (Digital Versatile Disc)), a magneto-optical disk, and a semiconductor memory.

The pieces of processing described above with reference to the flowchart are not necessarily performed in time series along the order described in the flowchart, but include the pieces of processing performed concurrently or individually (for example, parallel processing or object-based processing). In the description, the system means a whole apparatus constructed with a plurality of devices.

An embodiment of the invention is not limited to the above embodiments, but various changes can be made without departing from the scope of the disclosure.

DESCRIPTION OF SYMBOLS

11 electricity storage system
12 electricity storage device
13 control device
14 power wiring
15 power supply
16 load
21 storage battery
22 charge unit
23 discharge unit
24 battery management system
31 input/output unit
32 memory
33 CPU
41 storage battery control device
42 data acquisition unit
43 discharge order decision unit
44 discharge power setting processor
45 discharge instruction unit
46 determination unit
51 power conditioner
52 controller

The invention claimed is:

1. A storage battery control device comprising:

a processor; and a memory including instructions that, when executed by the processor, cause the processor to perform operations including:

referring to an order previously set according to at least two parameters defining a life and an output of a storage battery that stores power, and determining, based on the at least two parameters acquired from the storage battery comprising a plurality of storage batteries, a discharge order based on which discharge is preferentially performed with respect to the plurality of storage batteries by referring to a table in which the discharge order of the storage battery is previously set based on a state of charge and a charge/discharge frequency of the storage battery; and setting discharge power output from each of the plurality of storage batteries based on the discharge order in order to supply necessary power necessary to be output upon an outside request, wherein two of the at least two parameters defining the life and the output of the storage battery are the state of charge and the charge/discharge frequency of the storage battery, and wherein, in the table, the discharge order is preferentially set from a row of cells having a lower charge/discharge frequency and from a cell having a higher state of charge in each row.

2. The storage battery control device according to claim 1, the operations further including setting the discharge power to the plurality of storage batteries based on maximum output at which the storage battery can output the power, rated output at which the storage battery can output the power with maximum efficiency, and minimum allowable output at which the storage battery can output the power with a prescribed efficiency lower than the maximum efficiency.

3. The storage battery control device according to claim 2, wherein, in setting the discharge power to n storage batteries each of which is identical to the battery, the discharge power is set according to the discharge order such that the storage battery having a higher priority preferentially discharges the power at the maximum output and such that the storage battery having a lower priority preferentially discharges the power at the rated output, when the necessary power is greater than n times as large as the rated output and less than or equal to n times as large as the maximum output.

4. The storage battery control device according to claim 2, wherein, in setting the discharge power to n storage batteries each of which is identical to the battery, the discharge power is set according to the discharge order such that the storage battery having a higher priority preferentially discharges the power at the rated output and such that the storage battery having a lower priority preferentially discharges the power at the minimum allowable output, when the necessary power is greater than n times as large as the minimum allowable output and less than or equal to n times as large as the rated output.

5. The storage battery control device according to claim 2, wherein, in setting the discharge power to n storage batteries each of which is identical to the battery, the discharge power is set according to the discharge order such that the storage battery having a higher priority preferentially discharges the power at the minimum allowable output and such that the output from the storage battery having a lower priority is preferentially stopped, when the necessary power is less than or equal to n times as large as the minimum allowable output.

6. The storage battery control device according to claim 1, the operations further including:

acquiring the parameters from the plurality of storage batteries; and determining that processing in which the determining determines that the storage battery to discharge the power is to be performed when the parameter acquired from the storage battery in discharge by the acquiring becomes less than a prescribed threshold.

7. A storage battery control method comprising:

referring to an order previously set according to at least two parameters defining a life and output of a storage battery that stores power, and deciding, based on the parameters acquired from the storage battery comprising a plurality of storage batteries, a discharge order based on which discharge is preferentially performed with respect to the plurality of storage batteries by referring to a table in which the discharge order of the storage battery is previously set based on a state of charge and a charge/discharge frequency of the storage battery; and setting discharge power output from each of the plurality of storage batteries based on the discharge order in order to supply necessary power necessary to be output upon an outside request, wherein two of the at least two parameters defining the life and the output of the storage battery are the state of charge and the charge/discharge frequency of the storage battery, and wherein, in the table, the discharge order is preferentially set from a row of cells having a lower charge/discharge frequency and from a cell having a higher state of charge in each row.

8. A non-transitory computer readable storage medium that stores a set of executable instructions for controlling an operation of a controller, the executable instructions, when executed by a processor, cause the processor to perform operations comprising:

referring to an order previously set according to at least two parameters defining a life and output of a storage battery that stores power, and deciding, based on the parameters acquired from the storage battery comprising a plurality of storage batteries, a discharge order based on which discharge is preferentially performed with respect to a plurality of storage batteries by referring to a table in which the discharge order of the storage battery is previously set based on a state of charge and a charge/discharge frequency of the storage battery; and setting discharge power output from each of the plurality of storage batteries based on the discharge order in order to supply necessary power necessary to be output upon an outside request, wherein two of the at least two parameters defining the life and the output of the storage battery are the state of charge and the charge/discharge frequency of the storage battery, and wherein, in the table, the discharge order is preferentially set from a row of cells having a lower charge/discharge frequency and from a cell having a higher state of charge in each row.

9. An electricity storage system comprising:

a plurality of storage batteries that store power;

a processor; and a memory including instructions that, when executed by the processor, cause the processor to perform operations including:

referring to an order previously set according to at least two parameters defining a life and output of the plurality of storage batteries, and deciding, based on the parameters acquired from the plurality of storage batteries, a discharge order based on which discharge is preferentially performed with respect to the plurality of storage batteries by referring to a table in which the discharge order of the plurality of storage batteries is previously set based on a state of charge and a charge/discharge frequency of the plurality of storage batteries; and setting discharge power output from each of the plurality of storage batteries based on the discharge order in order to supply necessary power necessary to be output upon an outside request, wherein two of the at least two parameters defining the life and the output of the plurality of storage batteries are the state of charge and the charge/discharge frequency of the plurality of storage batteries, and wherein, in the table, the discharge order is preferentially set from a row of cells having a lower charge/discharge frequency and from a cell having a higher state of charge in each row.

10. A power supply system comprising:

a power supply comprising one of a DC power supply in which at least natural energy is used and an AC power supply configured to supply power via a power system;

a load connected to the power supply via a power wiring to consume the power;

a plurality of storage batteries connected in parallel to the power supply via the power wiring to store the power;

a processor; and a memory including instructions that, when executed by the processor, cause the processor to perform operations including:

referring to an order previously set according to at least two parameters defining a life and output of the plurality of storage batteries, and deciding, based on the parameters acquired from the plurality of storage batteries, a discharge order based on which discharge is preferentially performed with respect to the plurality of storage batteries by referring to a table in which the discharge order of the plurality of storage batteries is previously set based on a state of charge and a charge/discharge frequency of the plurality of storage batteries;

setting discharge power output from each of the plurality of storage batteries based on the discharge order in order to supply necessary power necessary to be output upon a request from the load, wherein two of the at least two parameters defining the life and the output of the plurality of storage batteries are the state of charge and the charge/discharge frequency of the plurality of storage batteries, and wherein, in the table, the discharge order is preferentially set from a row of cells having a lower charge/discharge frequency and from a cell having a higher state of charge in each row.

* * * * *